(12) United States Patent
Ryu et al.

(10) Patent No.: US 12,289,258 B2
(45) Date of Patent: Apr. 29, 2025

(54) HYBRID AUTOMATIC REPEAT REQUEST PROCESS SPACE MANAGEMENT FOR MULTI-CELL SCHEDULING

(71) Applicant: QUALCOMM Incorporated, San Diego, CA (US)

(72) Inventors: Jae Ho Ryu, San Diego, CA (US); Kazuki Takeda, Tokyo (JP); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 17/817,819

(22) Filed: Aug. 5, 2022

(65) Prior Publication Data

US 2024/0048297 A1 Feb. 8, 2024

(51) Int. Cl.
*H04L 5/00* (2006.01)
*H04L 1/1812* (2023.01)
*H04W 72/1273* (2023.01)

(52) U.S. Cl.
CPC ............ *H04L 5/001* (2013.01); *H04L 1/1812* (2013.01); *H04L 5/0055* (2013.01); *H04W 72/1273* (2013.01)

(58) Field of Classification Search
CPC ..... H04L 5/001; H04L 1/1812; H04L 5/0055; H04L 1/1864; H04L 1/1822; H04W 72/1273
See application file for complete search history.

(56) References Cited

U.S. PATENT DOCUMENTS

2019/0222402 A1* 7/2019 Yang .................. H04L 5/001
2023/0327824 A1* 10/2023 Yang .................. H04L 1/1854

OTHER PUBLICATIONS

Intel Corporation: "Discussions on Multi-cell Scheduling with a Single DCI", 3GPP TSG RAN WG1 #109-e, R1-2204816, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 30, 2022, pp. 1-12, XP052144077, p. 1, line 2, Para 1, p. 5, lines 13-14, Para 3.4, p. 5, lines 3-4, p. 3, lines 7-12, Para 3.1, p. 4, lines 3-5, p. 1, lines 3-4, Para 2.1, p. 6, lines 8-11, Para 4, p. 9, lines 9-10, Para 6, p. 4, lines 1-2, Para 3.3.
International Search Report and Written Opinion—PCT/US2023/070589—ISA/EPO—Nov. 10, 2023.

(Continued)

*Primary Examiner* — Dady Chery
(74) *Attorney, Agent, or Firm* — Harrity & Harrity, LLP

(57) ABSTRACT

Various aspects of the present disclosure generally relate to wireless communication. In some aspects, a network node may transmit a multi-cell scheduling downlink control information (DCI) associated with at least two component carriers (CCs) for multi-cell communication with a user equipment (UE), the multi-cell scheduling DCI including a hybrid automatic repeat request (HARQ) process identification field that is based at least in part on a merged HARQ process space associated with the at least two CCs. The network node may receive HARQ feedback associated with the multi-cell communication, the HARQ feedback being based at least in part on the merged HARQ process space. Numerous other aspects are described.

30 Claims, 12 Drawing Sheets

(56) References Cited

OTHER PUBLICATIONS

Lenovo: "Discussion on Multi-cell Scheduling via a Single DCI", 3GPP TSG RAN WG1 #109-e, R1-2203706, 3rd Generation Partnership Project, Mobile Competence Centre, 650, Route Des Lucioles, F-06921 Sophia-Antipolis Cedex, France, vol. RAN WG1, No. E-meeting, May 9, 2022-May 20, 2022, Apr. 29, 2022, 9 Pages, XP052153131.

* cited by examiner

HYBRID AUTOMATIC REPEAT REQUEST PROCESS SPACE MANAGEMENT FOR MULTI-CELL SCHEDULING

FIELD OF THE DISCLOSURE

Aspects of the present disclosure generally relate to wireless communication and to techniques and apparatuses for hybrid automatic repeat request process space management for multi-cell scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include transmitting a multi-cell scheduling downlink control information (DCI) associated with at least two component carriers (CCs) for multi-cell communication with a user equipment (UE), the multi-cell scheduling DCI including a hybrid automatic repeat request (HARQ) process identification field that is based at least in part on a merged HARQ process space associated with the at least two CCs. The method may include receiving HARQ feedback associated with the multi-cell communication, the HARQ feedback being based at least in part on the merged HARQ process space.

Some aspects described herein relate to a method of wireless communication performed by a UE. The method may include receiving a multi-cell scheduling DCI associated with at least two CCs for multi-cell communication by the UE, the multi-cell scheduling DCI including a merged HARQ process identification field that is based at least in part on a merged HARQ process space associated with the at least two CCs. The method may include transmitting HARQ feedback associated with the multi-cell communication, the HARQ feedback being based at least in part on the HARQ process identification field.

Some aspects described herein relate to an apparatus for wireless communication at a network node. The apparatus may include a memory and one or more processors coupled to the memory. The one or more processors may be configured to transmit a multi-cell scheduling DCI associated with at least two CCs for multi-cell communication with a UE, the multi-cell scheduling DCI including a HARQ process identification field that is based at least in part on a merged HARQ process space associated with the at least two CCs. The one or more processors may be configured to receive HARQ feedback associated with the multi-cell communication, the HARQ feedback being based at least in part on the merged HARQ process space.

Some aspects described herein relate to an apparatus for wireless communication at a UE. The apparatus may include a memory and one or more processors coupled to the memory. The one or more processors may be configured to receive a multi-cell scheduling DCI associated with at least two CCs for multi-cell communication by the UE, the multi-cell scheduling DCI including a merged HARQ process identification field that is based at least in part on a merged HARQ process space associated with the at least two CCs. The one or more processors may be configured to transmit HARQ feedback associated with the multi-cell communication, the HARQ feedback being based at least in part on the HARQ process identification field.

Some aspects described herein relate to a non-transitory computer-readable medium that stores a set of instructions by a network node. The set of instructions, when executed by one or more processors of the network node, may cause the network node to transmit a multi-cell scheduling DCI associated with at least two CCs for multi-cell communication with a UE, the multi-cell scheduling DCI including a HARQ process identification field that is based at least in part on a merged HARQ process space associated with the at least two CCs. The set of instructions, when executed by one or more processors of the network node, may cause the network node to receive HARQ feedback associated with the multi-cell communication, the HARQ feedback being based at least in part on the merged HARQ process space.

Some aspects described herein relate to a non-transitory computer-readable medium that stores a set of instructions by a UE. The set of instructions, when executed by one or more processors of the UE, may cause the UE to receive a multi-cell scheduling DCI associated with at least two CCs for multi-cell communication by the UE, the multi-cell scheduling DCI including a merged HARQ process identification field that is based at least in part on a merged HARQ process space associated with the at least two CCs. The set of instructions, when executed by one or more processors of the UE, may cause the UE to transmit HARQ feedback associated with the multi-cell communication, the HARQ feedback being based at least in part on the HARQ process identification field.

Some aspects described herein relate to an apparatus. The apparatus may include means for transmitting a multi-cell scheduling DCI associated with at least two CCs for multi-cell communication with a UE, the multi-cell scheduling DCI including a HARQ process identification field that is based at least in part on a merged HARQ process space associated with the at least two CCs. The apparatus may include means for receiving HARQ feedback associated with the multi-cell communication, the HARQ feedback being based at least in part on the merged HARQ process space.

Some aspects described herein relate to an apparatus. The apparatus may include means for receiving a multi-cell scheduling DCI associated with at least two CCs for multi-cell communication by the UE, the multi-cell scheduling DCI including a merged HARQ process identification field that is based at least in part on a merged HARQ process space associated with the at least two CCs. The apparatus may include means for transmitting HARQ feedback associated with the multi-cell communication, the HARQ feedback being based at least in part on the HARQ process identification field.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
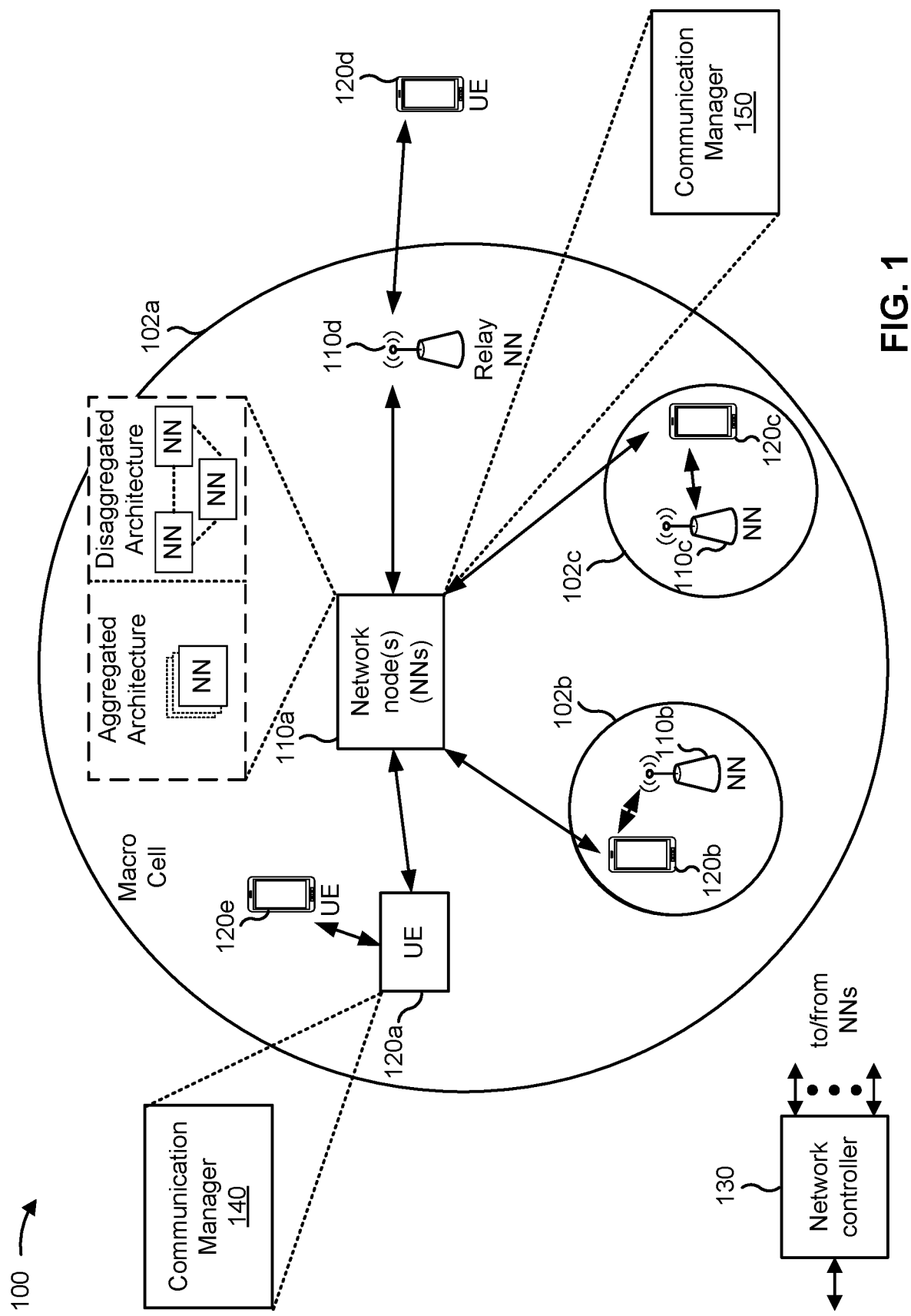
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node may include a communication manager 150. As described in more detail elsewhere herein, the communication manager 150 may transmit a multi-cell scheduling DCI associated with at least two CCs for multi-cell communication with a UE, the multi-cell scheduling DCI including a HARQ process identification field that is based at least in part on a merged HARQ process space associated with the at least two CCs; and receive HARQ feedback associated with the multi-cell communication, the HARQ feedback being based at least in part on the merged HARQ process space. Additionally, or alternatively, the communication manager 150 may perform one or more other operations described herein.

In some aspects, the UE 120 may include a communication manager 140. As described in more detail elsewhere herein, the communication manager 140 may receive a multi-cell scheduling DCI associated with at least two CCs for multi-cell communication by the UE, the multi-cell scheduling DCI including a merged HARQ process identification field that is based at least in part on a merged HARQ process space associated with the at least two CCs; and transmit HARQ feedback associated with the multi-cell communication, the HARQ feedback being based at least in part on the HARQ process identification field. Additionally, or alternatively, the communication manager 140 may perform one or more other operations described herein.

As indicated above, FIG. 1 is provided as an example. Other examples may differ from what is described with regard to FIG. 1.

Figure 2:
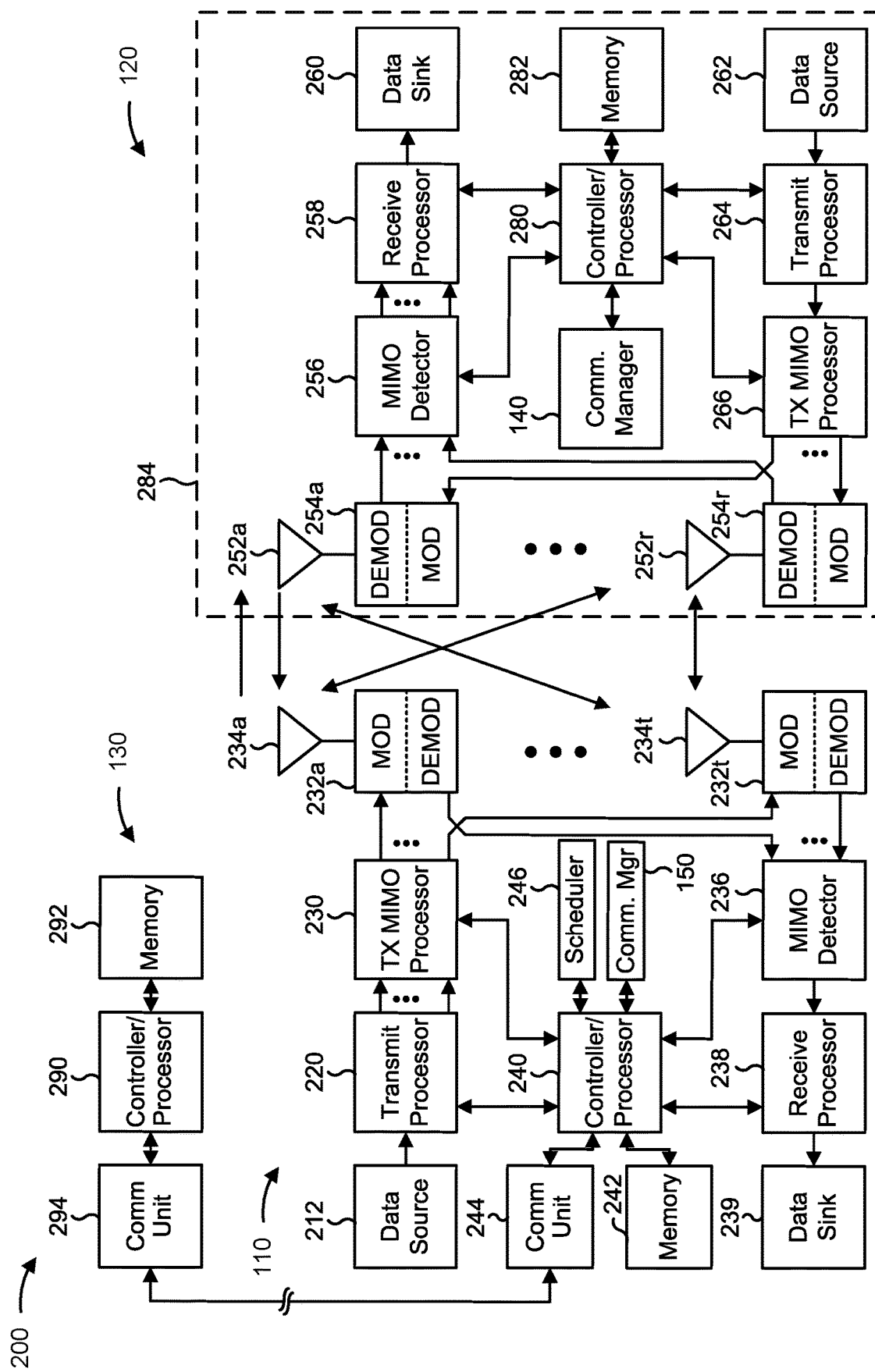
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-11).

The controller/processor 240 of the network node 110, the controller/processor 280 of the UE 120, and/or any other component(s) of FIG. 2 may perform one or more techniques associated with HARQ process space management for multi-cell scheduling, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the network node includes means for transmitting a multi-cell scheduling DCI associated with at least two CCs for multi-cell communication with a UE, the multi-cell scheduling DCI including a HARQ process identification field that is based at least in part on a merged HARQ process space associated with the at least two CCs; and/or means for receiving HARQ feedback associated with the multi-cell communication, the HARQ feedback being based at least in part on the merged HARQ process space. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving a multi-cell scheduling DCI associated with at least two CCs for multi-cell communication by the UE, the multi-cell scheduling DCI including a merged HARQ process identification field that is based at least in part on a merged HARQ process space associated with the at least two CCs; and/or means for transmitting HARQ feedback associated with the multi-cell communication, the HARQ feedback being based at least in part on the HARQ process identification field. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station (BS), a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
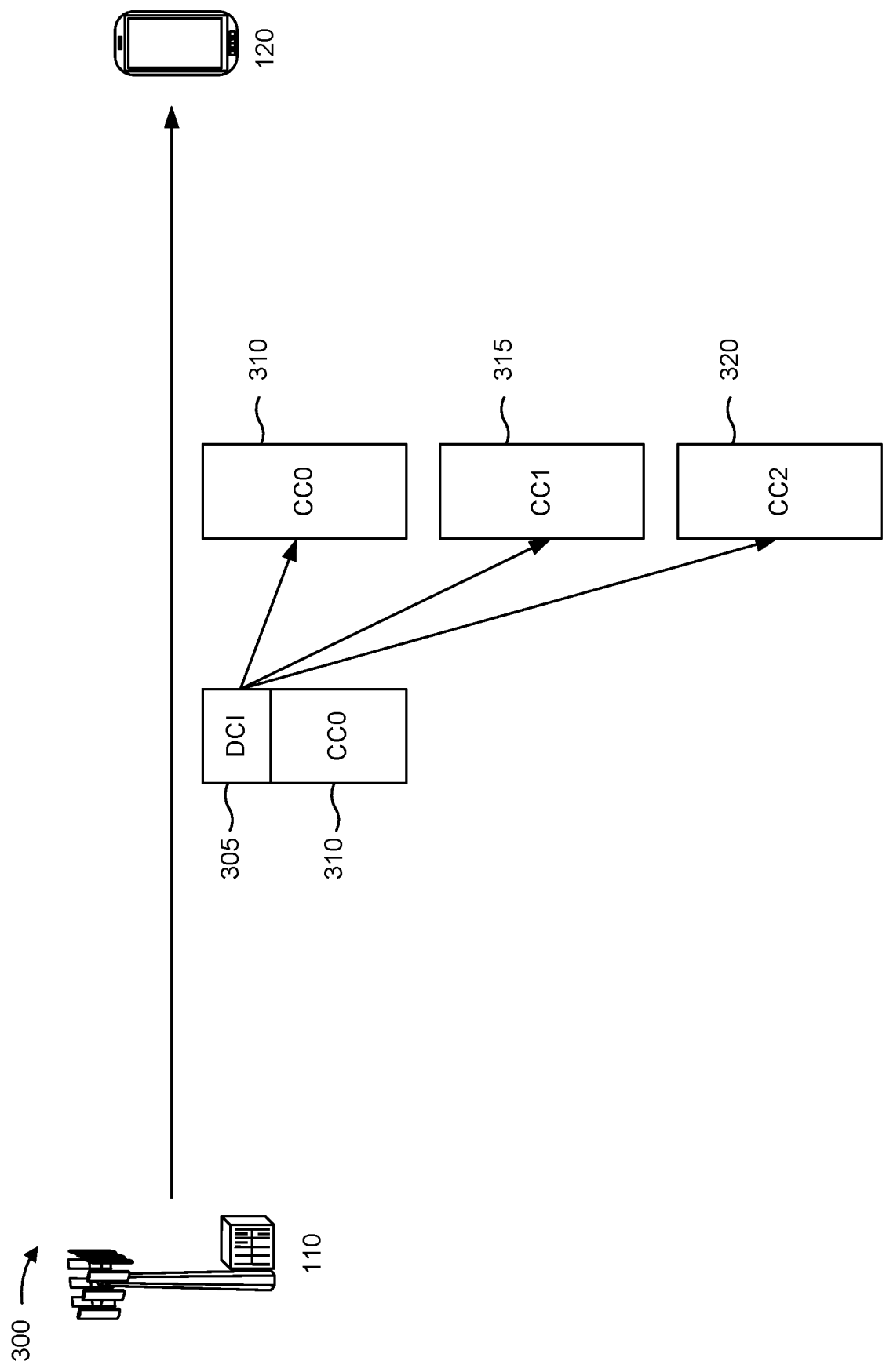
FIG. 3 is a diagram illustrating an example of downlink control information (DCI) that schedules multiple cells, in accordance with the present disclosure.

FIG. 3 is a diagram illustrating an example 300 of downlink control information (DCI) that schedules multiple cells, in accordance with the present disclosure. As shown in FIG. 3, a network node 110 and a UE 120 may communicate with one another (e.g., directly or via one or more network nodes).

The network node 110 may transmit, to the UE 120 (e.g., directly or via one or more network nodes), DCI 305 that schedules multiple communications for the UE 120. The multiple communications may be scheduled for at least two different cells. In some cases, a cell may be referred to as a component carrier (CC). DCI that schedules a communication for a cell via which the DCI is transmitted may be referred to as self-carrier (or self-cell) scheduling DCI. DCI that schedules a communication for a cell via which the DCI is transmitted may be referred to as cross-carrier (or cross-cell) scheduling DCI. To illustrate, the DCI 305 may be cross-carrier scheduling DCI, and may or may not be self-carrier scheduling DCI. In some aspects, the DCI 305 that carries communications in at least two cells may be referred to as combination DCI.

In the example 300, the DCI 305 schedules a communication for a first cell 310 that carries the DCI 305 (shown as CC0), schedules a communication for a second cell 315 that does not carry the DCI 305 (shown as CC1), and schedules a communication for a third cell 320 that does not carry the DCI 305 (shown as CC2). While the example 300 shows that the DCI 305 may schedule three cells, other examples may include the DCI 305 scheduling communications on a different number of cells (e.g., two cells, four cells, five cells, and so on). The number of cells may be greater than or equal to two.

A communication scheduled by the DCI 305 may include a data communication, such as a physical downlink shared channel (PDSCH) communication or a physical uplink shared channel (PUSCH) communication. For a data communication, the DCI 305 may schedule a single transport block (TB) across multiple cells or may separately schedule multiple TBs in the multiple cells. Additionally, or alternatively, a communication scheduled by the DCI 305 may include a reference signal, such as a channel state information reference signal (CSI-RS) or a sounding reference signal (SRS). For a reference signal, the DCI 305 may trigger a single resource for reference signal transmission across multiple cells or may separately schedule multiple resources for reference signal transmission in the multiple cells. In some cases, scheduling information in the DCI 305 may be indicated once and reused for multiple communications (e.g., on different cells), such as a modulation and coding scheme (MCS), a resource to be used for acknowledgement (ACK) or negative acknowledgement (NACK) of a communication scheduled by the DCI 305, and/or a resource allocation for a scheduled communication, to conserve signaling overhead. In some aspects, DCI may include hybrid automatic repeat request (HARQ) information.

HARQ refers to a retransmission protocol (e.g., a HARQ protocol) in which a wireless communication receiver device checks for errors in received data. If an error is detected, the receiver device may buffer the received data and request a retransmission from a wireless communication transmitter device. Based at least in part on the HARQ protocol, the receiver device may combine the buffered received data with retransmitted data prior to channel decoding and error detection, which improves performance of the retransmission. The HARQ protocol may be implemented at a medium access control (MAC) layer in a protocol stack.

The HARQ protocol relies on the transmitter device receiving ACKs or NACKs from the receiver device. To illustrate, a single HARQ process stops and waits for an ACK before proceeding to transfer additional data. Accordingly, the transmitter device may become inactive (with respect to communicating with the receiver wireless communication device) while waiting for an ACK or waiting for a scheduling opportunity. Multiple HARQ processes may be used to avoid the round-trip time having an impact on throughput. That is, other HARQ processes may transfer data while a given HARQ process is waiting for an ACK. The transmitter device may buffer transmitted data until a positive ACK has been received (e.g., in case a retransmission is needed). Data is cleared from the transmit buffer once a positive ACK has been received or the maximum number of allowed retransmissions has been reached. New data can be sent by a given HARQ process once the transmit buffer has been cleared.

The HARQ protocol can be used on the downlink or on the uplink. "Downlink HARQ" may refer to the transfer of downlink data on PDSCH with HARQ ACKs returned either on a physical uplink control channel (PUCCH) or a PUSCH.

"Uplink HARQ" may refer to the transfer of uplink data on a PUSCH with HARQ acknowledgments returned on a physical downlink control channel (PDCCH). For both downlink HARQ and uplink HARQ, each serving cell has its own HARQ entity and its own set of HARQ processes. Further, both downlink HARQ and uplink HARQ are asynchronous, meaning that there is no fixed timing pattern for each HARQ process. Rather, a network node must signal an identity of a relevant HARQ process with each downlink resource allocation. Notably, while asynchronous HARQ increases signaling overhead, asynchronous HARQ increases flexibility since retransmissions do not have to be scheduled during specific slots.

A dynamic downlink resource allocation may be provided on a PDCCH using DCI. DCI associated with a dynamic downlink resource allocation may include information that enables operation of downlink HARQ, such as information indicating a HARQ process number, a new data indicator (NDI), a redundancy version (RV), a PDSCH-to-HARQ feedback timing indicator, a PUCCH resource indicator, a downlink assignment index (DAI), code block group (CBG) transmission information (CBGTI), CBG flushing information (CBGFI), modulation and coding (MCS) information, or frequency resource allocation information (e.g., resource block allocation information), among other examples. Similarly, a dynamic uplink resource allocation can be provided on a PDCCH using DCI. DCI associated with a dynamic uplink resource allocation can include information that enables operation of uplink HARQ, such as information indicating a HARQ process number, an NDI, an RV, or CBGTI.

In some aspects, maintaining multiple HARQ processes for each cell of the multiple cells (e.g., multiple CCs) via the single DCI (e.g., the DCI 305) may pose challenges. To illustrate, each PDSCH and/or PUSCH scheduled on a respective CC of the multiple CCs may carry a separate transport block (TB), and each TB may be assigned a respective HARQ process ID (e.g., a per-CC HARQ process ID). Including per-CC HARQ information in the single DCI may increase a size of the DCI and result in more air interface resources (e.g., time resources and/or frequency resources) being used for transmitting the DCI and fewer air interface resources being used for transmitting payload. Fewer air interface resources for payload transmissions may result in increased data transfer latencies and/or reduced data throughput in a wireless network. As another example, a common HARQ process ID (e.g., instead of a per-CC HARQ process ID) may reduce a flexibility associated with the multiple HARQ processes, such as by a transmitter device delaying data transmission to one or more of the multiple CCs to align the HARQ processes. Delaying data transmission may also result in increased data transfer latencies and/or reduced data throughput in the wireless network.

Some techniques and apparatuses described herein provide HARQ process space management for multi-cell scheduling. In some aspects, a network node may transmit a multi-cell scheduling DCI that is associated with at least two CCs of multi-cell communication with a UE. The multi-cell scheduling DCI may include a HARQ process identification field that is based at least in part on a merged HARQ process space associated with the at least two CCs. A "merged HARQ process space" may denote a grouping of CCs (e.g., selected by a network node) that are associated with a multi-cell wireless communication by a device, such as downlink dual connectivity, uplink dual connectivity, downlink carrier aggregation, and/or uplink carrier aggregation associated with a UE. The network node may then receive HARQ feedback associated with the multi-cell communication, such as from the UE. In some aspects, the HARQ feedback is based at least in part on the merged HARQ process space, such as HARQ feedback for one or more HARQ processes associated with CCs merged in the HARQ process space.

In some aspects, a UE may receive a multi-cell scheduling DCI that is associated with at least two CCs of multi-cell communication by the UE. The multi-cell scheduling DCI may include a HARQ process identification field that is based at least in part on a merged HARQ process space associated with the at least two CCs. The UE may then transmit HARQ feedback associated with the multi-cell communication. In some aspects, the HARQ feedback may be based at least in part on the HARQ process identification field.

By using a merged HARQ process space, a network node may indicate multiple HARQ processes assigned to multiple CCs in a multi-cell scheduling DCI that uses fewer bits relative to a second DCI that includes a respective group of bits for each CC (e.g., of the multiple CCs associated with a same multi-cell communication). For example, the multi-cell scheduling DCI may indicate a first HARQ process ID for a first scheduled CC of the multiple CCs and a UE may derive additional HARQ process IDs for other CCs by incrementing the first HARQ process ID for each respective CC and/or each additional HARQ process. A multi-cell scheduling DCI that uses fewer bits may consume less air interface resources (e.g., relative to the second DCI) and preserve more air interface resources for payload transmissions. Using more air interface resources for payload transmissions increases data throughput and/or reduces data transfer latencies. The ability to assign multiple HARQ process IDs to each CC also provides more flexibility to HARQ management relative to using a common HARQ process ID, such as by eliminating a need to align the HARQ processes with one another. The increased flexibility may reduce delays in the HARQ processes, increase data throughput, and/or reduce data transfer latencies.

As indicated above, FIG. 3 is provided as an example. Other examples may differ from what is described with respect to FIG. 3.

Figure 4A:
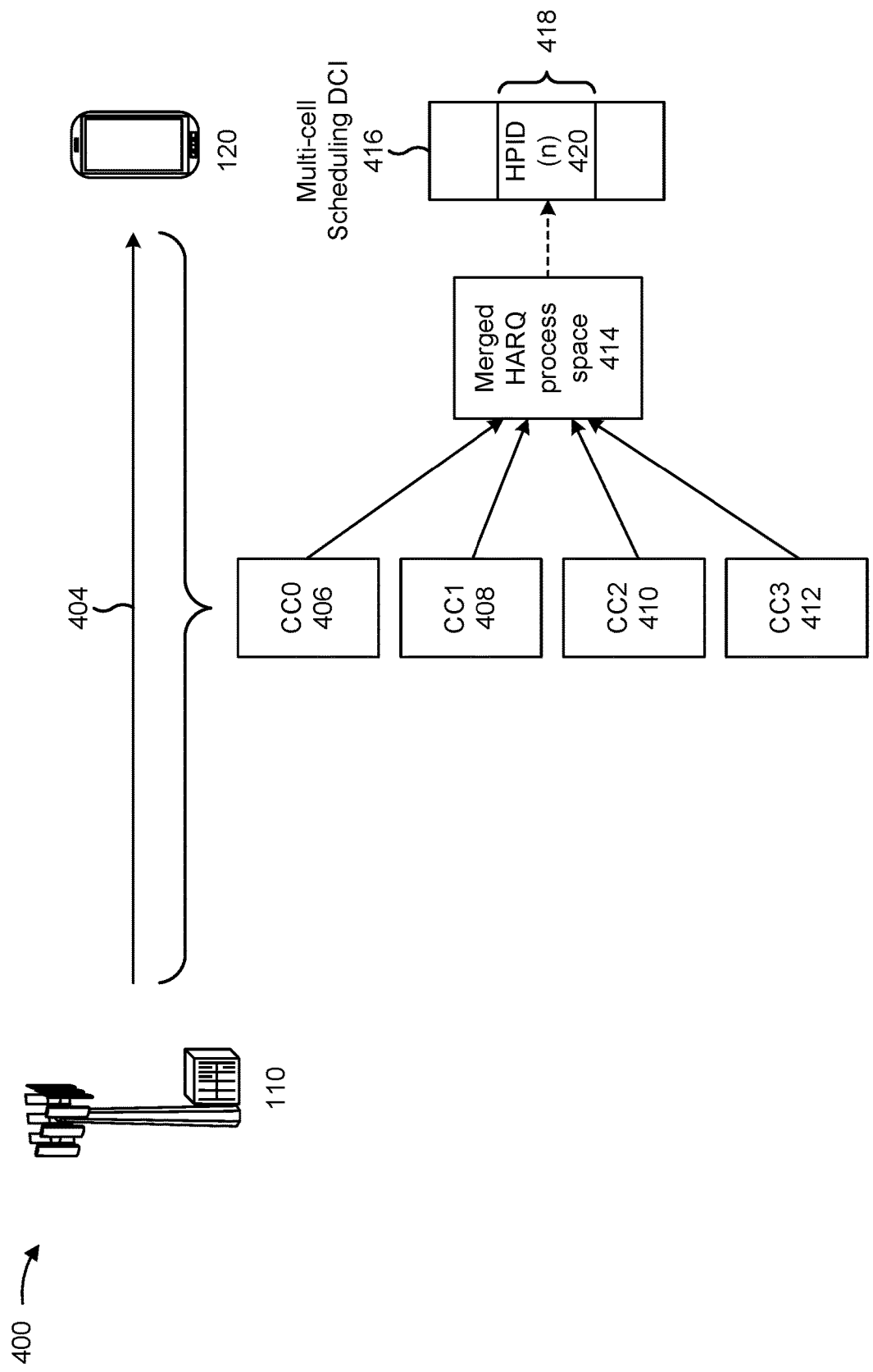
FIGS. 4A and 4B are diagrams illustrating a first example of a network node transmitting a multi-cell scheduling DCI and a second example of a UE assigning HARQ process numbers based at least in part on the multi-cell scheduling DCI, in accordance with the present disclosure.
Figure 4B:
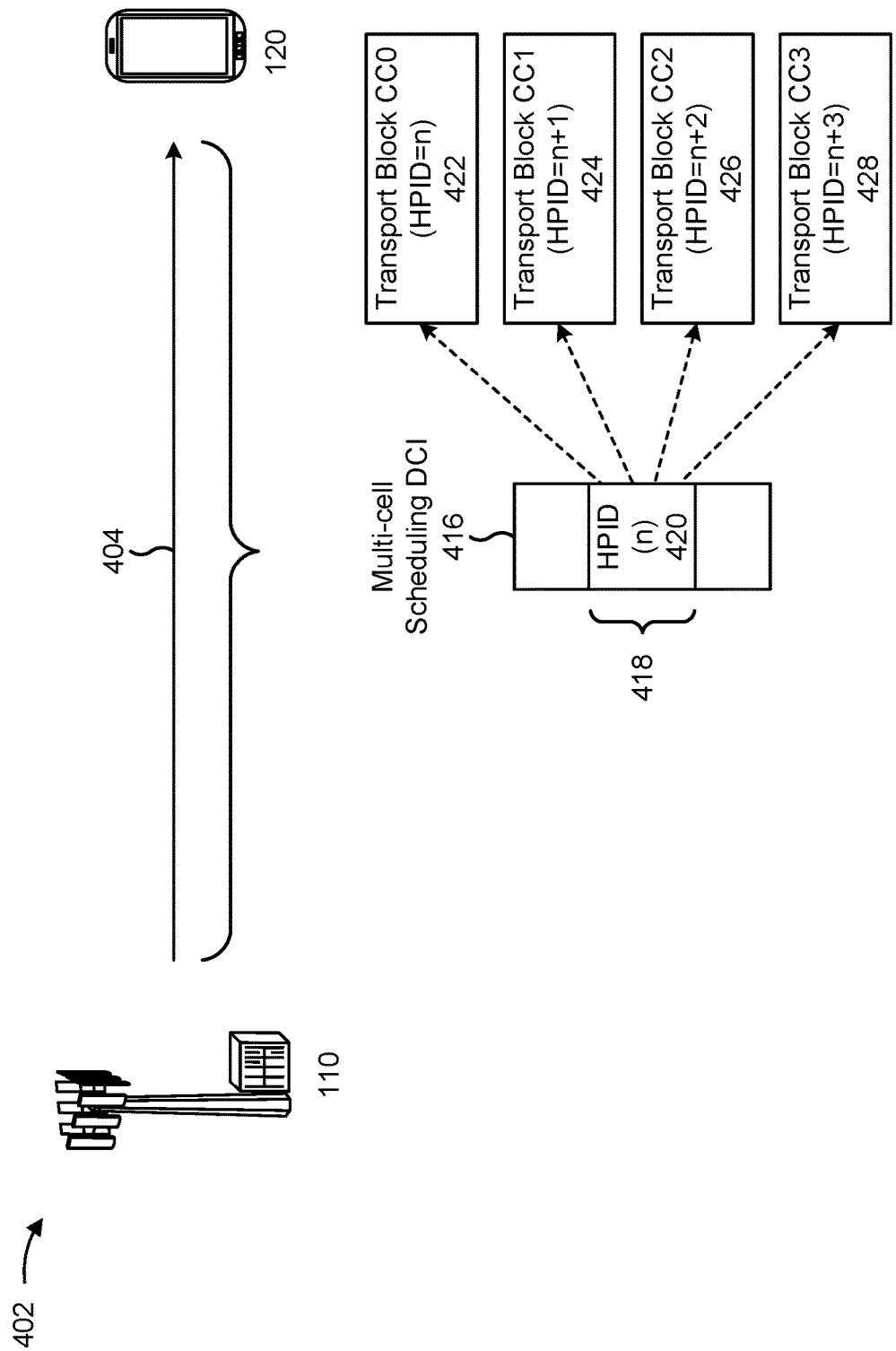

FIGS. 4A and 4B are diagrams illustrating a first example 400 of a network node transmitting a multi-cell scheduling DCI and a second example 402 of a UE assigning HARQ process numbers based at least in part on the multi-cell scheduling DCI, in accordance with the present disclosure.

As shown by the example 400 of FIG. 4A, a network node 110 may participate in a multi-cell wireless communication 404 with a UE 120 that may include a multi-cell downlink communication (e.g., from the network node 110 to the UE 120) and/or a multi-cell uplink communication (e.g., from the UE 120 to the network node 110). To illustrate, the multi-cell wireless communication 404 may include a first transmission associated with a first component carrier 406 (a first CC 406), a second transmission associated with a second component carrier 408 (a second CC 408), a third transmission associated with a third component carrier 410 (a third CC 410), and/or a fourth transmission associated with a fourth component carrier 412 (a fourth CC 412). Thus, while the example 400 shows four CCs being associated with the multi-cell wireless communication 404, other examples may include more CCs and/or fewer CCs. For clarity, the example 400 shows a single network node participating in the multi-cell wireless communication 404, but other examples may include more network nodes participating in the multi-cell wireless communication 404.

In some aspects, the network node 110 may determine to form a merged HARQ process space 414 that is based at least in part on the first CC 406, the second CC 408, the third CC 410, and the fourth CC 412 being associated with the multi-cell wireless communication 404. Alternatively, or additionally, the network node 110 may form and/or configure the merged HARQ process space 414 based at least in part on the first CC 406, the second CC 408, the third CC 410, and the fourth CC 412 being associated with any combination of a cell group (CG), dual connectivity with the UE 120, a PUCCH cell group, and/or a PUCCH secondary cell (Scell). To illustrate, the network node 110 may determine to form a first merged HARQ process space that includes the first CC 406, the second CC 408, the third CC 410, and the fourth CC 412 based at least in part on all of the CC being in a same CG. Alternatively, or additionally, the network node 110 may determine to form a second merged HARQ process space that includes all of the CCs based at least in part on the CCs participating in multi-cell dual-connectivity communication with the UE 120, and/or a third HARQ process space that includes all CCs based at least in part on the CCs being in a same PUCCH cell group.

The network node 110 may determine to assign K HARQ processes to each of N CCs included in the merged HARQ process space, where K is an integer (e.g., 16) and N is an integer (shown as four in the example 400). Accordingly, the network node 110 may assign K×N=M HARQ processes to the merged HARQ process space 414, where M is an integer that represents a total number of HARQ processes associated with, and/or assigned to, a merged HARQ process space. For example, for N=4 CCs, the network node 110 may determine to assign K=16 HARQ processes to each CC, resulting in M=64 total HARQ processes assigned to the merged HARQ process space 414.

To indicate the total number of HARQ processes and/or one or more HARQ process number assignments to the UE 120, the network node 110 may transmit a multi-cell scheduling DCI 416 that includes a HARQ process identification field 418, such as a multi-cell PDSCH scheduling DCI and/or a multi-cell PUSCH scheduling DCI. In some aspects, a length and/or size of the HARQ process identification field 418 may indicate the total number of HARQ processes. As one example, the HARQ process identification field 418 may include log 2(M) and/or ⌈log 2(M)⌉, where ⌈ ⌉ denotes a ceiling function used to round the result up to an integer. Referring to the above example of M=64, the HARQ process identification field 418 may have ⌈log 2(64)⌉=6 bits. Accordingly, the UE 120 may derive a total number of HARQ processes assigned to the merged HARQ process space 414 based at least in part on a size of the HARQ process identification field 418.

The network node 110 may configure the HARQ process identification field 418 with a HARQ process identifier 420 (HPID 420). For instance, the network node 110 may set the bit values of the HARQ process identification field 418 to a value of n, where n is an integer. In some aspects, the network node 110 may indicate that the value stored in the HARQ process identification field 418 (e.g., n) is a first HARQ process identifier (ID) associated with a first scheduled CC in the multi-cell communication. As one example, the network node 110 may indicate, and/or the UE 120 may determine, a scheduling order of the CCs (e.g., a first CC, a second CC, and/or a last CC) based at least in part on a radio resource control (RRC) configuration message and/or carrier subset information in DCI. To illustrate, the network node 110 may indicate a scheduling order in the RRC configuration message based at least in part on including a list of CCs in the RRC configuration and ordering the list of CCs based at least in part on a scheduling order (e.g., a first CC is listed in a first position within the list and/or a second CC is listed in a second position within the list). The network node 110 may indicate a subset of CCs, from the list of CCs, based at least in part on DCI. Alternatively, or additionally, the network node 110 may indicate that subsequent HARQ process IDs for subsequently scheduled CCs in the multi-cell communication may be derived from the value stored in the HARQ process identification field 418, such as by indicating that the subsequent HARQ process IDs may be derived based at least in part on incrementing the value by one.

As shown by the example 402 of FIG. 4B, the UE 120 may receive the multi-cell scheduling DCI 416 and recover the HPID 420 from the HARQ process identification field 418. In some aspects, the UE 120 may assign a first HARQ process associated with a first transport block (TB) 422 a first HARQ process ID of n based at least in part on the first TB 422 being transmitted by and/or with a first scheduled CC (e.g., the CC0). To illustrate, the UE 120 may assign the value indicated in the HARQ process identification field 418 as the first HARQ process ID. Alternatively, or additionally, the UE 120 may derive additional HARQ process IDs from n, such as by deriving a second HARQ process ID by incrementing n by 1 (e.g., n+1), a third HARQ process ID by incrementing the second HARQ process ID by 1 (e.g., n+2), and/or a fourth HARQ process ID by incrementing the third HARQ process ID by 1 (e.g., n+3). That is, the UE 120 may derive subsequent HARQ process IDs as in-sequence (e.g., in a given order and consecutive) HARQ process IDs. The UE 120 may assign the in-sequence HARQ process IDs to subsequently scheduled CCs (e.g., and/or each respective TB assigned to each respective scheduled CC) participating in the multi-cell communication, such as by assigning the second HARQ process ID (e.g., n+1) to a second TB 424 associated with a second scheduled CC (e.g., CC1), the third HARQ process ID (e.g., n+2) to a third TB 426 associated with a third scheduled CC (e.g., CC2), and/or the fourth HARQ process ID (e.g., n+3) to a fourth TB 428 associated with a fourth scheduled CC (e.g., CC3).

While the example 400 shows the UE 120 incrementing the HARQ process ID and assigning the incremented HARQ process ID, other examples may include the UE 120 refraining from assigning the incremented HARQ process ID to a TB. To illustrate, a start and length indicator value (SLIV) may denote an allocation for PDSCH (e.g., in the time domain), such as a start symbol and/or a number of (consecutive) symbols associated with the PDSCH allocation. In some aspects, the UE 120 may detect an error in a received TB based at least in part on the SLIV, such as by failing to receive a PDSCH carrying the TB as indicated by the SLIV. Based at least in part on detecting an SLIV error associated with a received TB, the UE 120 may refrain from assigning the incremented HARQ process ID to the CC based at least in part on not receiving a TB on the CC associated with the SLIV error. In some aspects, the UE 120 may assign the incremented HARQ process ID to a next TB received without the SLIV error.

By using a merged HARQ process group, a network node may indicate a single HARQ process ID in a multi-cell scheduling DCI and further indicate to derive subsequent HARQ process IDs using the single HARQ process ID. Indicating a single HARQ process ID enables the network node to use fewer bits in the multi-cell scheduling DCI and, subsequently, use fewer air interface resources. The preserved air interface resources may then be used for payload transmissions. The ability to assign multiple HARQ process IDs based at least in part on transmitting a single HARQ process ID also provides increased flexibility to HARQ management relative to using a common HARQ process ID. The increased flexibility and preserved air interface resources for payload transmissions increases data throughput and/or reduces data transfer latencies in a wireless network.

As indicated above, FIGS. 4A and 4B are provided as examples. Other examples may differ from what is described with regard to FIGS. 4A and 4B.

Figure 5:
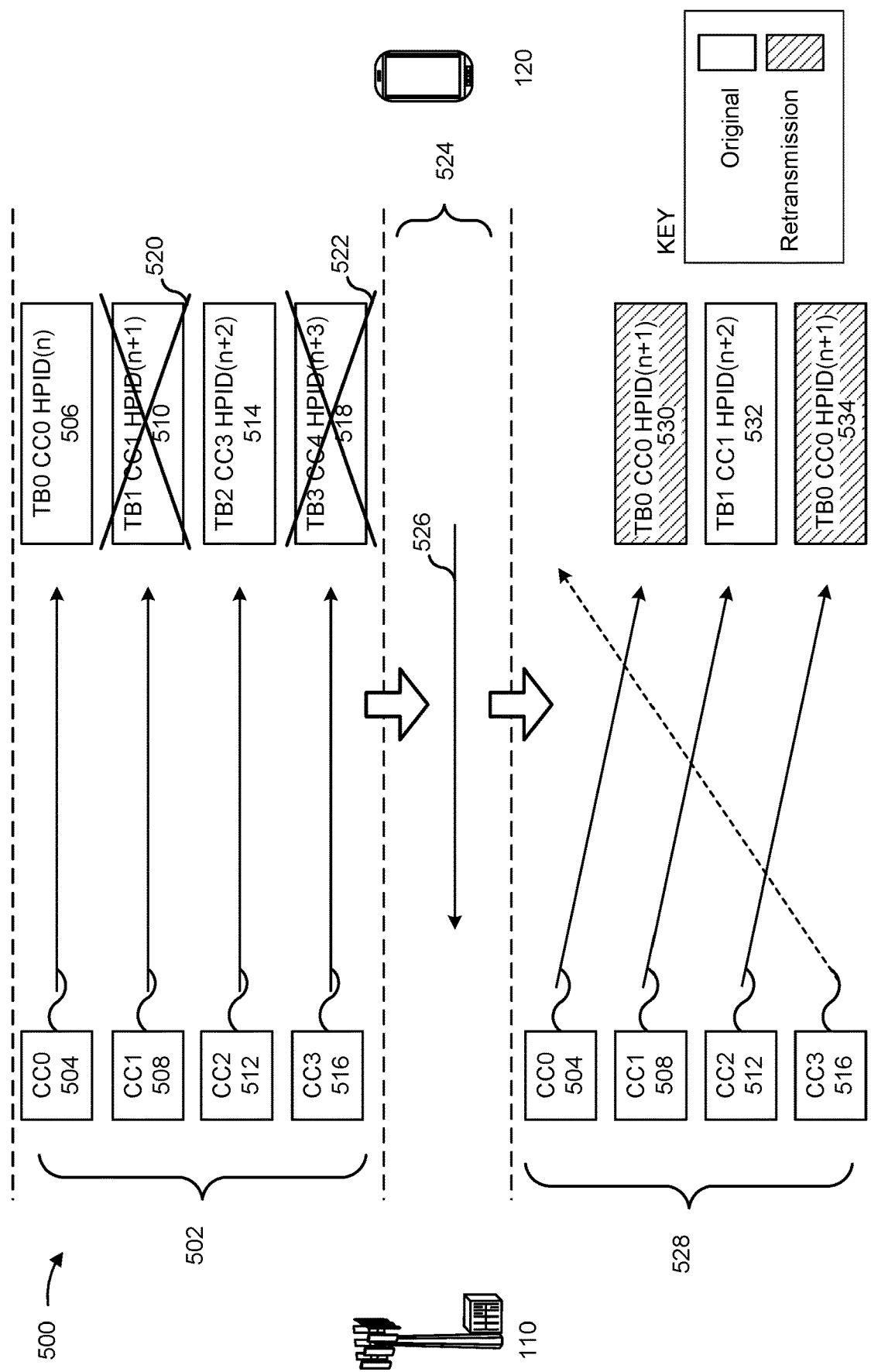
FIG. 5 is a diagram illustrating an example of a hybrid automatic repeat request (HARQ) retransmission based at least in part on a multi-cell communication, in accordance with the present disclosure.

FIG. 5 is a diagram illustrating an example 500 of a HARQ retransmission based at least in part on a multi-cell communication, in accordance with the present disclosure.

The example 500 shown by FIG. 5 illustrates a progression of communications between a network node 110 and a UE 120. In some aspects, the example 500 may be considered a continuation of the example 400 and the example 402 described with regard to FIGS. 4A and 4B. For example, the UE 120 may be configured with multiple HARQ process IDs based at least in part on receiving a multi-cell scheduling DCI (e.g., the multi-cell scheduling DCI 416) as further described with regard to FIG. 4A and/or deriving the multiple HARQ process ID's as further described with regard to FIG. 4B. For clarity, the example 500 illustrates a single network node 110, but other examples may use multiple network nodes, such as by using a respective network node for each CC.

As shown by reference number 502, the network node 110 may transmit one or more TBs to the UE 120 based at least in part on a multi-cell communication (e.g., using multiple CCs). A top-to-bottom ordering of the CCs shown by the example 500 indicates a scheduling order for each CC in the multi-cell communication, from earliest to latest. For example, a first scheduled CC 504 (e.g., CC0 shown at a top position) may transmit a first TB 506, a second scheduled CC 508 (e.g., CC1 shown at a second from top position) may transmit a second TB 510, a third scheduled CC 512 (e.g., CC2 shown at a third from top position) may transmit a third TB 514, and/or a fourth scheduled CC 516 (e.g., CC3 shown at a bottom position) may transmit a fourth TB 518. In some aspects, the first TB 506, the second TB 510, the third TB 514, and/or the fourth TB 518 are original transmissions of data, as shown by the solid white fill, and not retransmissions. While the example 500 shows the multi-cell communication as a downlink communication from the network node 110 to the UE 120, other examples may include the multi-cell communication being an uplink communication from the UE 120 to the network node 110.

In some aspects, the UE 120 may assign a first HARQ process ID (e.g., n) to a first HARQ process associated with the first TB 506. As further described with regard to FIG. 4B, the UE 120 may derive and assign a second HARQ process ID to a second HARQ process associated with the second TB 510, a third HARQ process ID to a third HARQ process associated with the third TB 514, and/or a fourth HARQ process ID to a fourth HARQ process associated with the fourth TB 518. As shown by the example 500, the UE 120 may fail to receive one or more of the TBs. To illustrate, and as shown by reference number 520, the UE 120 may fail to receive the second TB 510, such as by failing to receive the second TB 510 with a first number of bit errors that satisfy an error threshold. Alternatively or additionally, and as shown by reference number 522, the UE 120 may fail to receive the fourth TB 518 with a second number of bit errors that satisfy the error threshold.

As shown by reference number 524, the UE 120 may transmit HARQ feedback 526 to the network node 110 that indicates one or more ACKs and/or NACKs based at least in part on reception of the first TB 506, the second TB 510, third TB 514, and/or the fourth TB 518. In some aspects, the HARQ feedback 526 may include one or more HARQ process IDs, some of which may be derived by the UE 120.

As shown by reference number 528, the network node 110 may retransmit data to the UE 120 (shown by a diagonal hash pattern). In some aspects, the network node 110 may transmit a retransmission using a different CC and/or serving cell for the retransmission than was used for the original transmission. To illustrate, the second scheduled CC 508 transmitted an original transmission of the second TB 510 associated with HARQ process ID n+1 as shown by the reference number 502. However, and as shown by reference number 530, a different CC (e.g., the first scheduled CC 504) may transmit a retransmission of the second TB that is associated with the HARQ process ID n+1. In some aspects, the different CC may transmit the retransmission based at least in part on the network node 110 prioritizing the retransmission and/or based at least in part on the different CC (e.g., the first scheduled CC 504) having earlier scheduling relative to the CC associated with the original transmission (e.g., the second scheduled CC 508).

After the retransmission shown by the reference number 530, the second scheduled CC 508 (e.g., a next available scheduled CC) may transmit a second original transmission (e.g., TB 532) that is associated with a different HARQ process ID than a first original transmission transmitted by the second scheduled CC 508. For example, the first original transmission (e.g., the second TB 510) by the second CC 508 has an association with the HARQ process ID n+1 and the second original transmission (e.g., the TB 532) has an association with the HARQ process ID n+2. As shown by reference number 534, the network node 110 may retransmit the fourth TB 518 based at least in part on the third scheduled CC 512 being available. The network node 110 may alternate between retransmissions and/or original transmissions based at least in part on priority and/or a next scheduled CC. To illustrate, after retransmission of the fourth TB 518 as shown by reference number 534, the network node may transmit either a retransmission or an original transmission using the fourth scheduled CC 516.

As indicated above, FIG. 5 is provided as an example. Other examples may differ from what is described with regard to FIG. 5.

Figure 6:
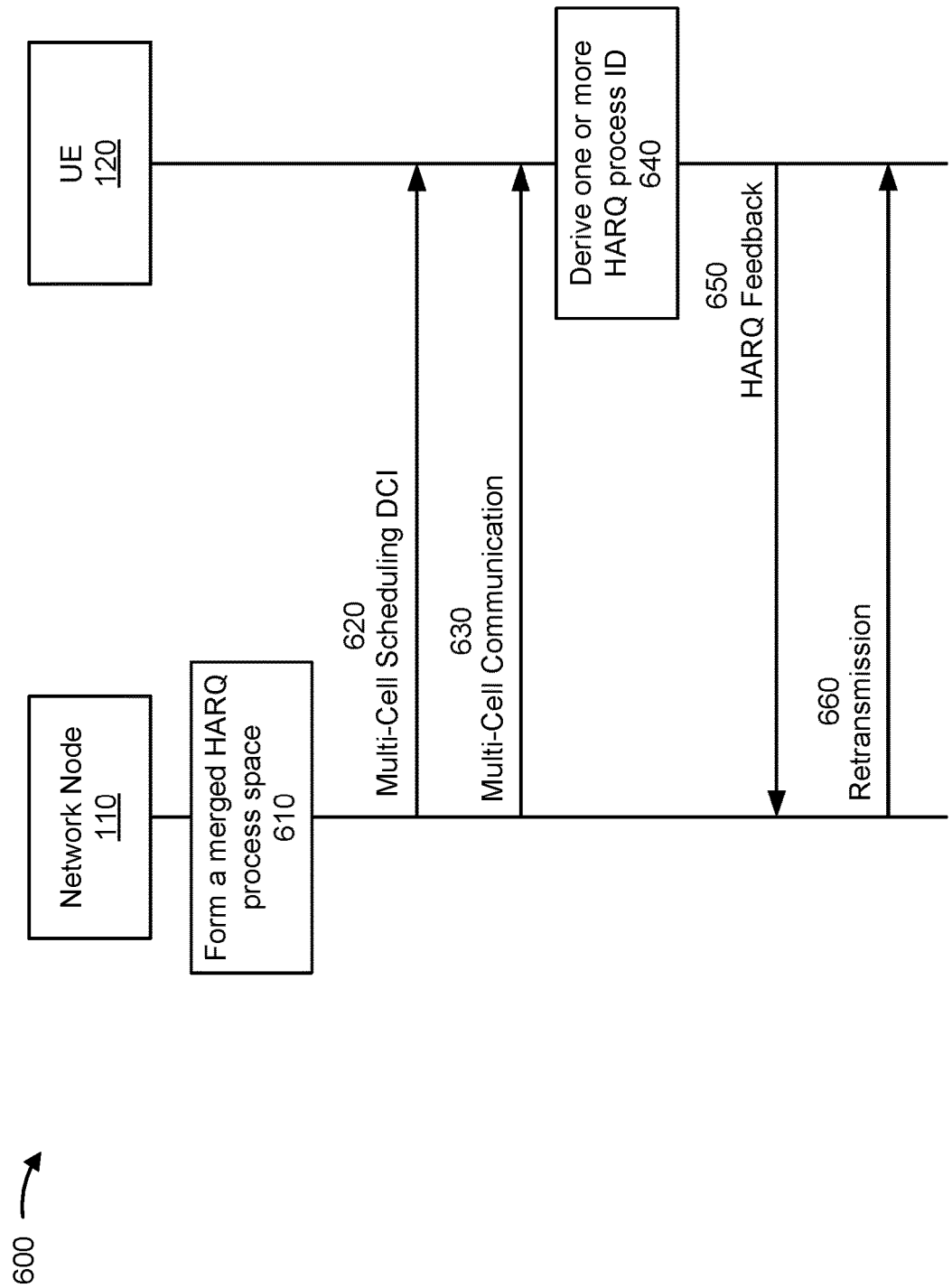
FIG. 6 is a diagram illustrating an example of a wireless communication process between a network node and a UE, in accordance with the present disclosure.

FIG. 6 is a diagram illustrating an example 600 of a wireless communication process between a network node (e.g., the network node 110) and a UE (e.g., the UE 120), in accordance with the present disclosure.

As shown by reference number 610, a network node 110 may form a merged HARQ process space. As one example, the network node 110 may form the merged HARQ process by selecting at least two CCs that are associated with a multi-cell wireless communication with a UE 120, such as by selecting at least two CCs associated with dual connectivity and/or carrier aggregation associated with the UE 120. Alternatively or additionally, the network node 110 may form the merged HARQ process by selecting two or more CCs based at least in part on the CCs being in a same cell group, a same PUCCH cell group, and/or a PUCCH secondary cell. In some aspects, at least some of the CCs may be associated with different serving cells. To illustrate, a first CC may be associated with a first serving cell and a second CC may be associated with a second serving cell. In forming the merged HARQ process space, the network node 110 may select a total number of HARQ processes to assign and/or associate with the merged HARQ process space as further described with regard to FIG. 4A.

As shown by reference number 620, the network node 110 may transmit, and the UE 120 may receive, a multi-cell scheduling DCI. In some aspects, the multi-cell scheduling DCI may be associated with scheduling multi-cell PDSCH and/or multi-cell PUSCH. Alternatively or additionally, the multi-cell scheduling DCI may include a HARQ process identification field that is based at least in part on the total number of HARQ processes assigned to the merged HARQ process space. To illustrate, a number of bits used for the HARQ process identification field may be based at least in part on the total number of HARQ processes (e.g., log 2(M) and/or ⌈log 2(M)⌉ bits). As further described with regard to FIG. 4A, the network node 110 may indicate, in the HARQ process identification field, a first HARQ process ID associated with a first scheduled CC (e.g., and/or a first HARQ process for a first received TB associated with the first scheduled CC). The network node 110 may alternatively or additionally indicate to derive additional HARQ process IDs based at least in part on the first HARQ process ID, such as by indicating to increment the first HARQ process ID by a value (e.g., one).

In some aspects, the network node 110 may form and/or associate the merged HARQ process with multiple CCs, but schedule a subset of CCs of the multiple CCs. To illustrate, the network node 110 may determine to schedule a first subset of CCs of multiple CCs and determine to refrain from scheduling a second subset of CCs of the multiple CCs. The network node 110 may indicate, in the multi-cell scheduling DCI, that the first HARQ process ID is associated with the first subset of CCs and disassociated with the second subset of CCs. That is, the network node 110 may indicate to derive HARQ process IDs for the first subset of CCs based at least in part on the HARQ process ID indicated in the multi-cell scheduling DCI and/or to exclude deriving and/or assigning HARQ process IDs for the second subset of CCs.

As shown by reference number 630, the network node 110 may transmit, and the UE 120 may receive, a multi-cell communication. While the example 600 shows the multi-cell communication as a downlink communication, other examples may include the multi-cell communication being an uplink communication. Accordingly, the multi-cell communication may be associated with a PDSCH transmission and/or a PUSCH transmission. As one example, the network node 110 may be associated with a first CC of multiple CCs used for the multi-cell communication. The network node 110 may transmit, to the UE 120, a first TB based at least in part on using a PDSCH associated with the first CC. As another example, the network node 110 may receive, from the UE 120, a second TB based at least in part on using a PUSCH associated with the first CC. As further described above, the multi-cell communication may be based at least in part on multiple serving cells, where each serving cell is associated with a respective CC of the multi-cell communication shown by reference number 630

As shown by reference number 640, the UE 120 may derive one or more HARQ process IDs based at least in part on the multi-cell scheduling DCI. As one example, the UE 120 may derive the HARQ process IDs based at least in part on a first HARQ process ID indicated in a HARQ process identification field of the multi-cell scheduling DCI. The UE 120 may assign the first HARQ process ID to a first TB received using a first scheduled CC and calculate a second HARQ process ID by incrementing the first HARQ process ID by one. The UE 120 may assign the second HARQ process ID to a second TB (e.g., the TB 424) received using a second scheduled CC (e.g., the second CC 408) and calculate a third HARQ process ID by incrementing the second HARQ process ID by one.

In some aspects, the UE 120 may refrain from assigning and/or deriving a new HARQ process ID until assigning a current HARQ process ID. For example, the UE may refrain from assigning a current HARQ process ID based at least in part on detecting an SLIV error associated with a received TB. The UE 120 may refrain from assigning the current HARQ process ID to the TB associated with the SLIV error and, subsequently, refrain from incrementing the current HARQ process ID (e.g., to derive a new HARQ process ID) until after assigning the current HARQ process ID.

As shown by reference number 650, the UE 120 may transmit, and the network node 110 may receive, HARQ feedback that is based at least in part on the multi-cell communication shown by the reference number 630. While the example 600 shows the UE 120 transmitting, and the network node 110 receiving, the HARQ feedback, other examples may include the network node 110 transmitting, and the UE 120 receiving, the HARQ feedback. The HARQ feedback may include any combination of ACKs and/or NACKs based at least in part on receive errors detected by the UE 120. For example, the UE 120 may transmit a first ACK associated with a first received TB associated with a first CC, a first NACK associated with a second received TB (e.g., received with errors) associated with a second CC, a second ACK associated with a third received TB associated with a third CC, and a second NACK associated with a fourth received TB (e.g., received with errors) associated with a fourth CC. Accordingly, the HARQ feedback may include multi-cell HARQ feedback that is based at least in part on the multi-cell scheduling DCI and/or the first HARQ process ID indicated by the multi-cell scheduling DCI.

As shown by reference number 660, the network node 110 may transmit, and the UE 120 may receive a retransmission that is based at least in part on the multi-cell communication shown by the reference number 630. While the example 600 shows the network node transmitting, and the UE 120 receiving, the retransmission, other examples may include the UE 120 transmitting, and the network node 110 receiving, the retransmission. In some aspects, the network node 110 may transmit the retransmission using a second CC that is different from a first CC that was used to transmit the original transmission as further described with regard to FIG. 5.

As indicated above, FIG. 6 is provided as an example. Other examples may differ from what is described with regard to FIG. 6.

Figure 7:
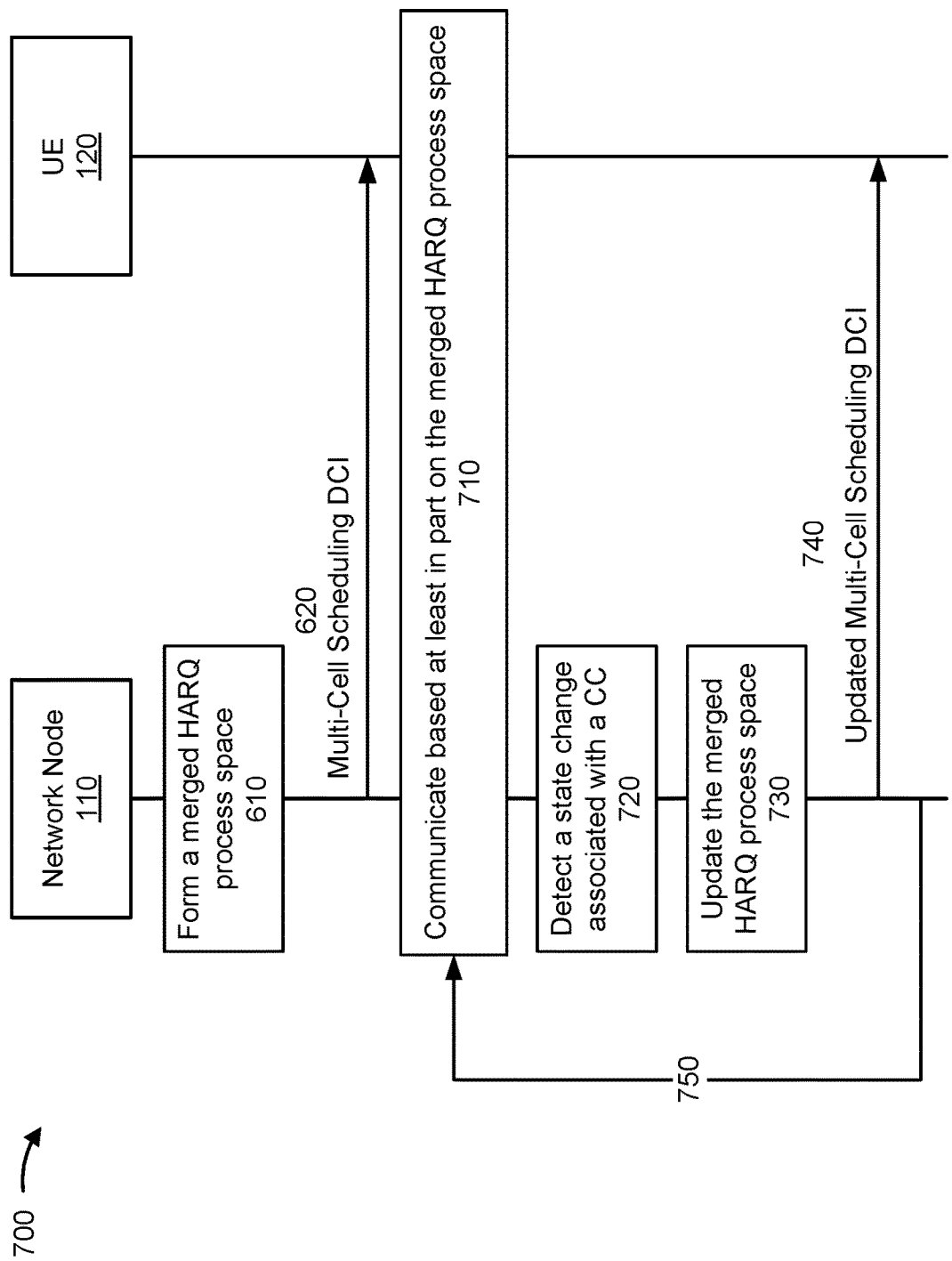
FIG. 7 is a diagram illustrating an example of a wireless communication process between a network node and a UE, in accordance with the present disclosure.

FIG. 7 is a diagram illustrating an example 700 of a wireless communication process between a network node (e.g., the network node 110) and a UE (e.g., the UE 120), in accordance with the present disclosure.

As shown by the example 700, a network node 110 may form a merged HARQ process space as further described with regard to the reference number 610 of FIG. 6. Based at least in part on forming the merged HARQ process space, the network node 110 may indicate a multi-cell scheduling DCI to a UE 120 as further described with regard to the reference number 620 of FIG. 6.

As shown by reference number 710, the network node 110 and the UE 120 may communicate with one another based at least in part on the merged HARQ process space. To illustrate, the network node 110 may transmit at least a first portion of a multi-cell downlink communication and/or the UE 120 may transmit at least a second portion of a multi-cell uplink communication that is received by the network node 110 as further described with regard to the reference number 630 of FIG. 6. Alternatively or additionally, the UE 120 may derive one or more HARQ process IDs based at least in part on the multi-cell scheduling DCI as further described with regard to the reference number 640 of FIG. 6. In some aspects, the UE 120 may transmit HARQ feedback to the network node 110 and/or the network node 110 may transmit HARQ feedback to the UE 120 as further described with regard to the reference number 650 of FIG. 6. Based at least in part on receiving the HARQ feedback, the network node 110 and/or the UE 120 may retransmit at least a portion of a multi-cell communication. The network node 110 and/or the UE 120 may iteratively communicate with one another based at least in part on any combination of the actions described above, where each iteration may include a different combination of actions.

As shown by reference number 720, the network node 110 may detect a state change associated with at least one CC included in the merged HARQ process space and/or participating in a multi-cell communication associated with the UE 120. To illustrate, a CC included in the merged HARQ process space and/or participating in a multi-cell communication may be based at least in part on a secondary cell. The network node 110 may detect a state change for the secondary cell, such as an activation state change (e.g., transitioning from an active state to an inactive state or transitioning from the inactive state to the active state) and/or a dormancy state change (e.g., transitioning from a dormant state to an active state or transitioning from the active state to the dormant state).

In some aspects, and based at least in part on detecting the state change associated with the secondary cell, the network node 110 may maintain a current merged HARQ process space. For example, the network node 110 may refrain from resetting a HARQ state for any of the HARQ processes associated with the merged HARQ process space (e.g., refrain from resetting the HARQ state based at least in part on detecting the state change). Alternatively, or additionally, the network node 110 may maintain a size of a HARQ process identification field in a multi-cell scheduling DCI. Accordingly, the network node 110 and the UE 120 may continue to communicate with one another based at least in part on the merged HARQ process space as further described with regard to the reference number 710.

Alternatively, and as shown by reference number 730, the network node may update the merged HARQ process space. To illustrate, the network node 110 may determine that, based at least in part on detecting the state change, a number of activated CCs participating in the multi-cell communication with the UE has changed from a first quantity of CCs to a second quantity of CCs. The CC quantity change may include the first quantity of CCs being less than the second quantity of CCs, or the first quantity of CCs being greater than the second quantity of CCs. In some aspects, and based at least in part on detecting the CC quantity change, the network node may recalculate a total number of HARQ processes for an updated merged HARQ process space (e.g. based at least in part on the second quantity of CCs).

Based at least in part on updating the merged HARQ process space, the network node 110 may determine that the number of activated CCs has decreased (e.g., the second quantity of CCs is less than the first quantity of CCs) and reset one or more HARQ processes associated with the number of activated CCs. To illustrate, the network node 110 may instruct the UE 120 to reset a subset of HARQ processes currently associated with the number of activated CCs and/or the multi-cell scheduling DCI with regard to the reference number 620. Alternatively, the network node 110 may determine that the number of activated CCs has increased, and refrain from resetting one or more HARQ processes associated with the number of activated CCs and/or the multi-cell scheduling DCI with regard to the reference number 620.

As shown by reference number 740, the network node 110 may indicate an updated multi-cell scheduling DCI to the UE 120, where the updated multi-cell scheduling DCI may be based at least in part on the updated merged HARQ process space. For example, the multi-cell scheduling DCI transmitted as shown with regard to the reference number 620 may have a first size and/or include a first HARQ process identification field with a first number of bits that is associated with a total number of HARQ processes assigned to the merged HARQ process space. The updated multi-cell scheduling DCI may have a second size and/or include a second HARQ process identification field with a second number of bits that is based at least in part on the network node 110 assigning an updated total number of HARQ processes to the updated merged HARQ process space (e.g., based at least in part on the changed number of activated CCs). Accordingly, a size of the updated multi-cell scheduling DCI may be different from a size of the (first) multi-cell scheduling DCI based at least in part on an increase or decrease in participating CCs and/or an increase or decrease in a total number of HARQ processes assigned to the updated merged HARQ process space.

As shown by reference number 750, the network node 110 and the UE 120 may communicate with one another based at least in part on the updated merged HARQ process space as further described with regard to the reference number 710. To illustrate, the network node 110 and/or the UE 120 may iteratively communicate with one another based at least in part on any combination of transmitting and/or receiving a multi-cell communication, deriving and/or calculating a HARQ process ID based at least in part on the updated multi-cell scheduling DCI, receiving and/or transmitting HARQ feedback based at least in part on a derived HARQ process ID, and/or retransmitting a TB based at least in part on the HARQ feedback, where each iteration may include a different combination of actions.

As indicated above, FIG. 7 is provided as an example. Other examples may differ from what is described with regard to FIG. 7.

Figure 8:
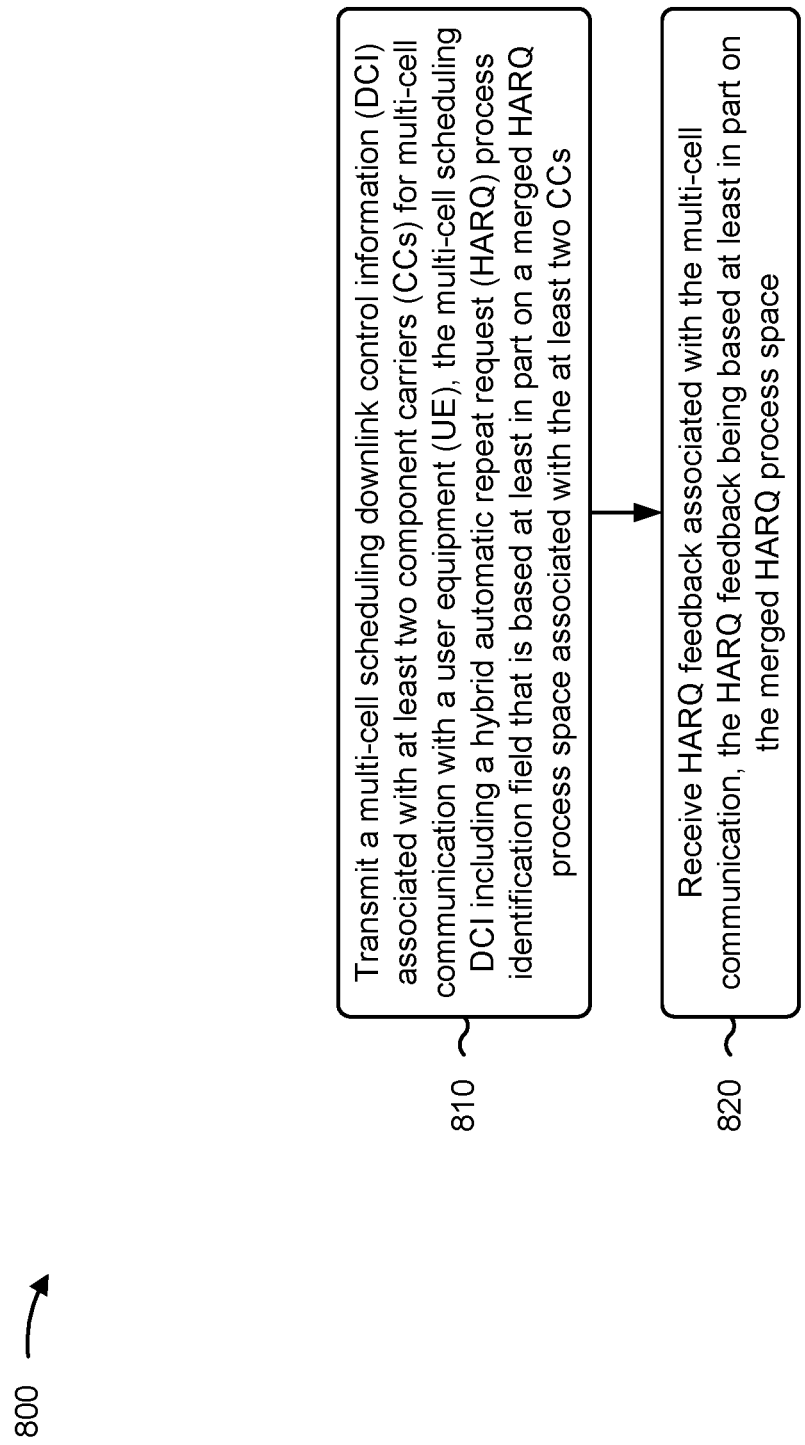
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with HARQ process space management for multi-cell scheduling.

As shown in FIG. 8, in some aspects, process 800 may include transmitting a multi-cell scheduling DCI associated with at least two CCs for multi-cell communication with a UE, the multi-cell scheduling DCI including a HARQ process identification field that is based at least in part on a merged HARQ process space associated with the at least two CCs (block 810). For example, the network node (e.g., using communication manager 150, transmission component 1004, and/or merged HARQ process manager component 1008, depicted in FIG. 10) may transmit a multi-cell scheduling DCI associated with at least two CCs for multi-cell communication with a UE, the multi-cell scheduling DCI including a HARQ process identification field that is based at least in part on a merged HARQ process space associated with the at least two CCs, as described above.

As further shown in FIG. 8, in some aspects, process 800 may include receiving HARQ feedback associated with the multi-cell communication, the HARQ feedback being based at least in part on the merged HARQ process space (block 820). For example, the network node (e.g., using communication manager 150 and/or reception component 1002, depicted in FIG. 10) may receive HARQ feedback associated with the multi-cell communication, the HARQ feedback being based at least in part on the merged HARQ process space, as described above.

By using a merged HARQ process space, a network node may indicate multiple HARQ processes assigned to multiple CCs in a multi-cell scheduling DCI that uses fewer bits relative to a second DCI that includes a respective group of bits for each CC (e.g., of the multiple CCs associated with a same multi-cell communication) and preserves air interface resources for payload transmissions. Using more air interface resources for payload transmissions increases data throughput and/or reduces data transfer latencies.

Process 800 may include additional aspects, such as any single aspect or any combination of aspects described below and/or in connection with one or more other processes described elsewhere herein.

In a first aspect, the multi-cell scheduling DCI indicates multi-cell physical downlink shared channel scheduling.

In a second aspect, the multi-cell scheduling DCI indicates multi-cell physical uplink shared channel scheduling.

In a third aspect, process 800 includes configuring the merged HARQ process space based at least in part on a CG.

In a fourth aspect, the merged HARQ process space is based at least in part on dual connectivity.

In a fifth aspect, the merged HARQ process space is based at least in part on a PUCCH cell group.

In a sixth aspect, the merged HARQ process space is based at least in part on the UE being configured with a PUCCH secondary cell.

In a seventh aspect, M is an integer associated with a total number of HARQ processes for the merged HARQ process space, and where the HARQ process identification field includes log 2(M) bits.

In an eighth aspect, process 800 includes including, in the HARQ process identification field, a first HARQ process ID associated with a first scheduled component carrier of the at least two CCs.

In a ninth aspect, process 800 includes indicating that a second HARQ process ID associated with a second scheduled component carrier of the at least two CCs is based at least in part on incrementing the first HARQ process ID by an integer value of one.

In a tenth aspect, process 800 includes indicating to refrain from assigning a HARQ process ID to one CC of the at least two CCs based at least in part on detecting an SLIV error.

In an eleventh aspect, process 800 includes determining to schedule a first subset of CCs of the at least two CCs, determining to refrain from scheduling a second subset of CCs of the at least two CCs, and indicating, in the multi-cell scheduling DCI, that the first HARQ process ID is associated with the first subset of CCs and disassociated with the second subset of CCs.

In a twelfth aspect, receiving the HARQ feedback further includes receiving a negative acknowledgement for a first transport block associated with a first HARQ process, where the first HARQ process is associated with a first CC of the at least two CCs, and retransmitting the first transport block based at least in part on a second CC of the at least two CCs.

In a thirteenth aspect, the first CC is associated with a first serving cell and the second CC is associated with a second serving cell.

In a fourteenth aspect, the at least two CCs are based at least in part on a secondary cell, and process 800 further includes detecting a state change for the secondary cell, and maintaining the merged HARQ process space.

In a fifteenth aspect, the state change includes at least one of an activation state change, or a dormancy state change.

In a sixteenth aspect, maintaining the merged HARQ process space includes refraining from resetting a HARQ state associated with the merged HARQ process space.

In a seventeenth aspect, the at least two CCs are based at least in part on a secondary cell, and process 800 further includes detecting a state change for the secondary cell, and determining an updated merged HARQ process space based at least in part on the state change.

In an eighteenth aspect, determining the updated merged HARQ process space further includes determining that a number of activated CCs included in the at least two CCs has changed from a first quantity of CCs to a second quantity of CCs, and recalculating a total number of HARQ processes for the merged HARQ process space based at least in part on the at least two CCs including the second quantity of CCs.

In a nineteenth aspect, process 800 includes the first quantity is less than the second quantity, or the first quantity is greater than the second quantity.

In a twentieth aspect, process 800 includes transmitting an updated multi-cell scheduling DCI based at least in part on the updated merged HARQ process space.

In a twenty-first aspect, where the updated multi-cell scheduling DCI has a first size that is based at least in part on the number of activated CCs including the second quantity of CCs, and where the multi-cell scheduling DCI has a second size that is based at least in part on the first quantity of CCs.

In a twenty-second aspect, a first HARQ process identification field size included in the updated multi-cell scheduling DCI is different from a second HARQ process identification field size included in the multi-cell scheduling DCI.

In a twenty-third aspect, determining that the number of activated CCs included in the at least two CCs has changed includes determining that the number of activated CCs has decreased, and where process 800 further includes resetting one or more HARQ processes associated with the number of activated CCs.

In a twenty-fourth aspect, determining that the number of activated CCs included in the at least two CCs has changed includes determining that the number of activated CCs has increased, and where process 800 further includes refraining from resetting one or more HARQ processes associated with the number of activated CCs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
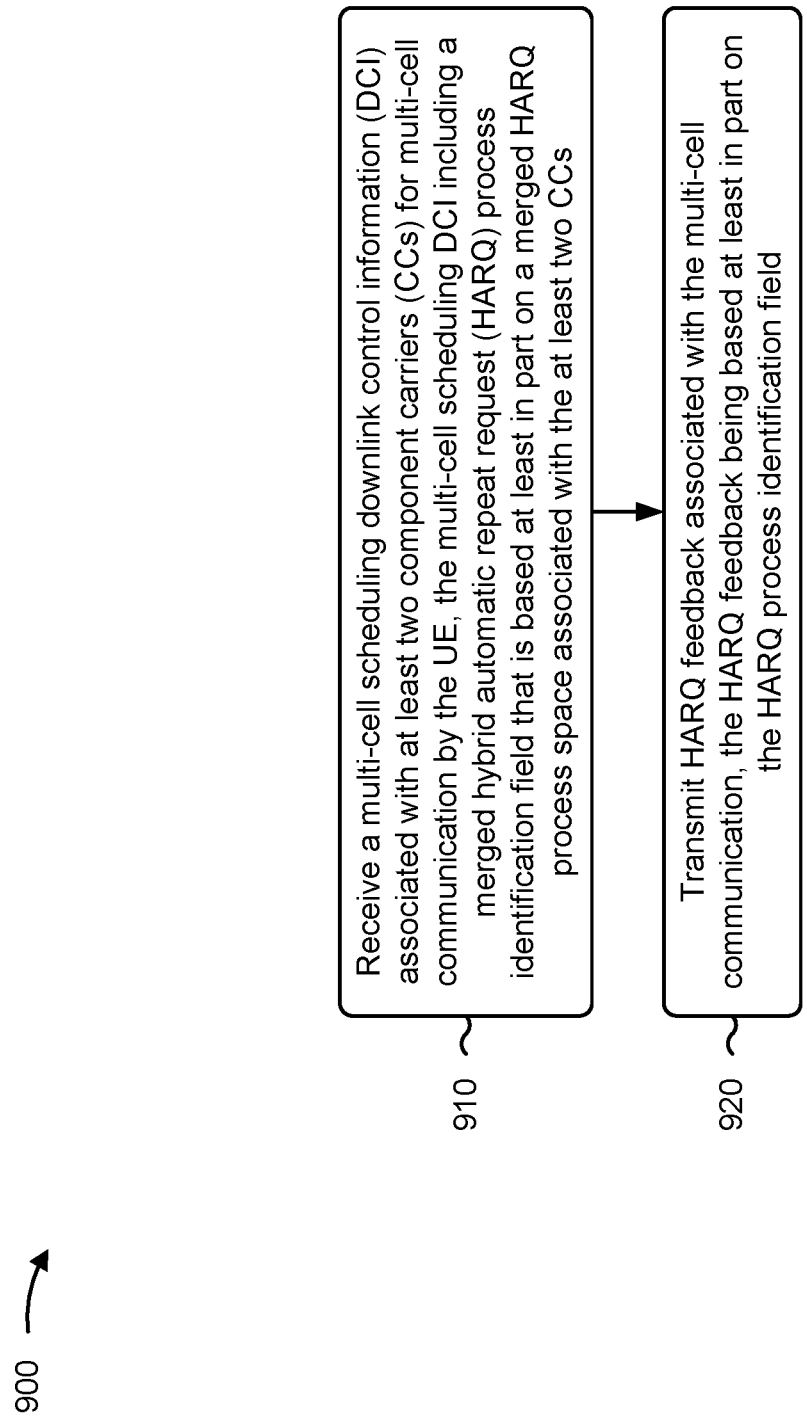
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated HARQ process space management for multi-cell scheduling.

As shown in FIG. 9, in some aspects, process 900 may include receiving a multi-cell scheduling DCI associated with at least two CCs for multi-cell communication by the UE, the multi-cell scheduling DCI including a merged HARQ process identification field that is based at least in part on a merged HARQ process space associated with the at least two CCs (block 910). For example, the UE (e.g., using communication manager 140 and/or reception component 1102, depicted in FIG. 11) may receive a multi-cell scheduling DCI associated with at least two CCs for multi-cell communication by the UE, the multi-cell scheduling DCI including a merged HARQ process identification field that is based at least in part on a merged HARQ process space associated with the at least two CCs, as described above.

As further shown in FIG. 9, in some aspects, process 900 may include transmitting HARQ feedback associated with the multi-cell communication, the HARQ feedback being based at least in part on the HARQ process identification field (block 920). For example, the UE (e.g., using communication manager 140 and/or transmission component 1104, depicted in FIG. 11) may transmit HARQ feedback associated with the multi-cell communication, the HARQ feedback being based at least in part on the HARQ process identification field, as described above.

Process 900 may include additional aspects, such as any single aspect or any combination of aspects described below and/or in connection with one or more other processes described elsewhere herein.

In a first aspect, the multi-cell scheduling DCI indicates multi-cell physical downlink shared channel scheduling.

In a second aspect, the multi-cell scheduling DCI indicates multi-cell physical uplink shared channel scheduling.

In a third aspect, the merged HARQ process space based at least in part on a cell group.

In a fourth aspect, the merged HARQ process space is based at least in part on dual connectivity.

In a fifth aspect, the merged HARQ process space is based at least in part on a PUCCH cell group.

In a sixth aspect, the merged HARQ process space is based at least in part on the UE being configured with a PUCCH secondary cell.

In a seventh aspect, M is an integer associated with a total number of HARQ processes for the merged HARQ process space, and where the HARQ process identification field includes log 2(M) bits.

In an eighth aspect, process 900 includes receiving, in the HARQ process identification field, a first HARQ process ID associated with a first scheduled component carrier of the at least two CCs.

In a ninth aspect, process 900 includes calculating a second HARQ process ID associated with a second scheduled component carrier of the at least two CCs is based at least in part on incrementing the first HARQ process ID by an integer value of one.

In a tenth aspect, process 900 includes refraining from assigning a HARQ process ID to one CC of the at least two CCs based at least in part on detecting an SLIV error.

In an eleventh aspect, the multi-cell scheduling DCI indicates that the first HARQ process ID is associated with a first subset of CCs of the at least two CCs and disassociated with a second set of CCs of the at least two CCs.

In a twelfth aspect, transmitting the HARQ feedback further includes transmitting a negative acknowledge for a first transport block associated with a first HARQ process, where the first HARQ process is associated with a first CC of the at least two CCs, and receiving a retransmission of the first transport block based at least in part on a second CC of the at least two CCs.

In a thirteenth aspect, the first CC is associated with a first serving cell and the second CC is associated with a second serving cell.

In a fourteenth aspect, process 900 includes receiving an updated multi-cell scheduling DCI based at least in part on an updated merged HARQ process space.

In a fifteenth aspect, a first HARQ process identification field size included in the updated multi-cell scheduling DCI is different from a second HARQ process identification field size included in the multi-cell scheduling DCI.

In a sixteenth aspect, the updated merged HARQ space is based at least in part on a number of activated CCs included in the at least two CCs changing from a first quantity of CCs to a second quantity of CCs.

In a seventeenth aspect, process 900 includes the second quantity is less than the first quantity, or the second quantity is greater than the first quantity.

In an eighteenth aspect, the updated multi-cell scheduling DCI has a first size that is based at least in part on the number of activated CCs including the second quantity of CCs, and where the multi-cell scheduling DCI has a second size that is based at least in part on the first quantity of CCs.

In a nineteenth aspect, process 900 includes receiving an indication to reset one or more HARQ processes associated with the number of activated CCs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
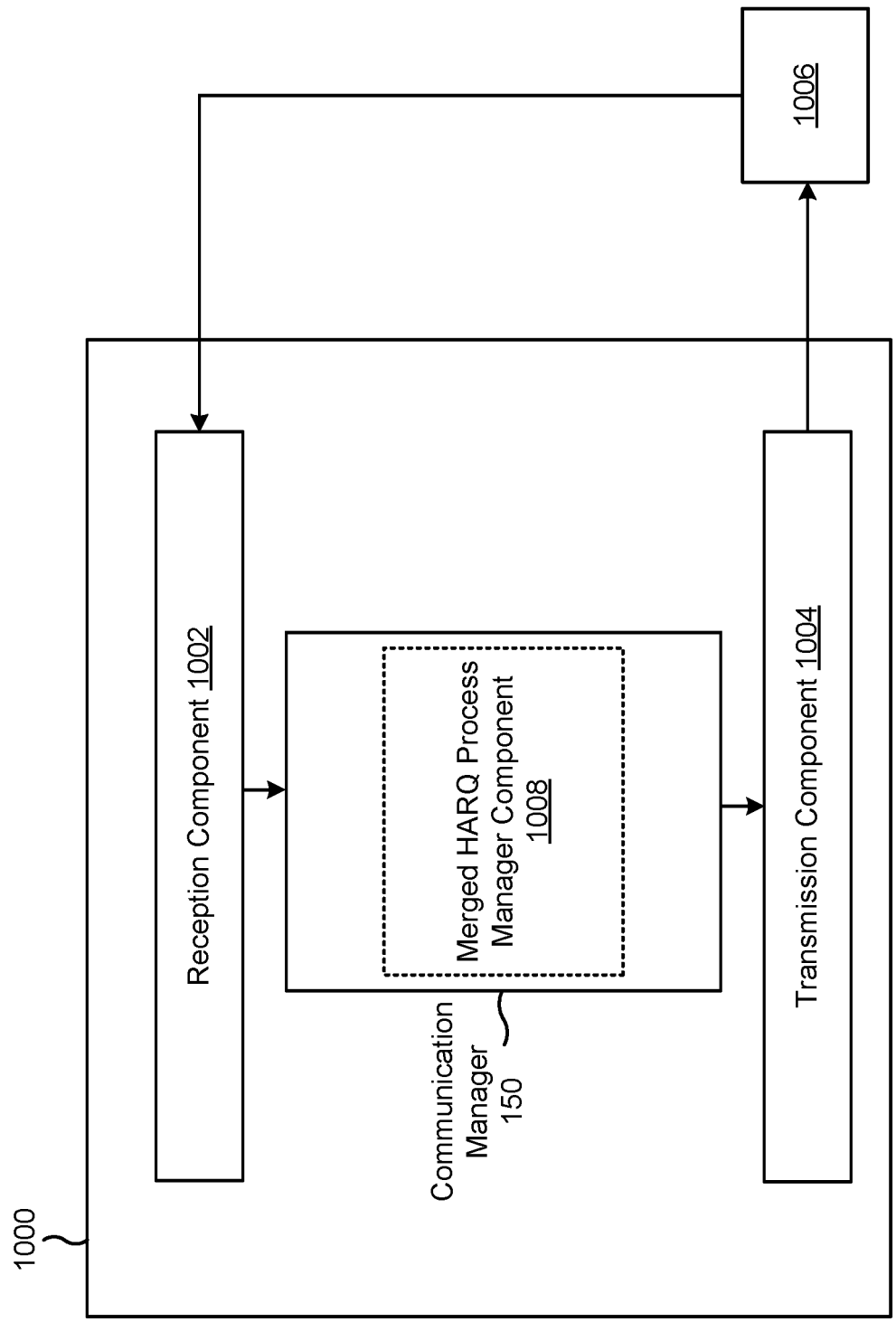
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a merged HARQ process manager component 1008, among other examples.

In some aspects, the apparatus 1000 may be configured to perform one or more operations described herein in connection with FIGS. 4A-9. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit a multi-cell scheduling DCI associated with at least two CCs for multi-cell communication with a UE, the multi-cell scheduling DCI including a HARQ process identification field that is based at least in part on a merged HARQ process space associated with the at least two CCs. The reception component 1002 may receive HARQ feedback associated with the multi-cell communication, the HARQ feedback being based at least in part on the merged HARQ process space.

The merged HARQ process manager component 1008 may configure the merged HARQ process space based at least in part on a CG. Alternatively or additionally, the merged HARQ process manager component 1008 may include, in the HARQ process identification field, a first HARQ process ID associated with a first scheduled component carrier of the at least two CCs. The merged HARQ process manager component 1008 may indicate that a second HARQ process ID associated with a second scheduled component carrier of the at least two CCs is based at least in part on incrementing the first HARQ process ID by an integer value of one. In some aspects, the merged HARQ process manager component 1008 may indicate to refrain from assigning a HARQ process ID to one CC of the at least two CCs based at least in part on detecting an SLIV error.

The merged HARQ process manager component 1008 may determine to schedule a first subset of CCs of the at least two CCs. Alternative or additionally, the merged HARQ process manager component 1008 may determine to refrain from scheduling a second subset of CCs of the at least two CCs. In some aspects, the merged HARQ process manager component 1008 may indicate, in the multi-cell scheduling DCI, that the first HARQ process ID is associated with the first subset of CCs and disassociated with the second subset of CCs.

The transmission component 1004 may transmit an updated multi-cell scheduling DCI based at least in part on the updated merged HARQ process space.

Figure 11:
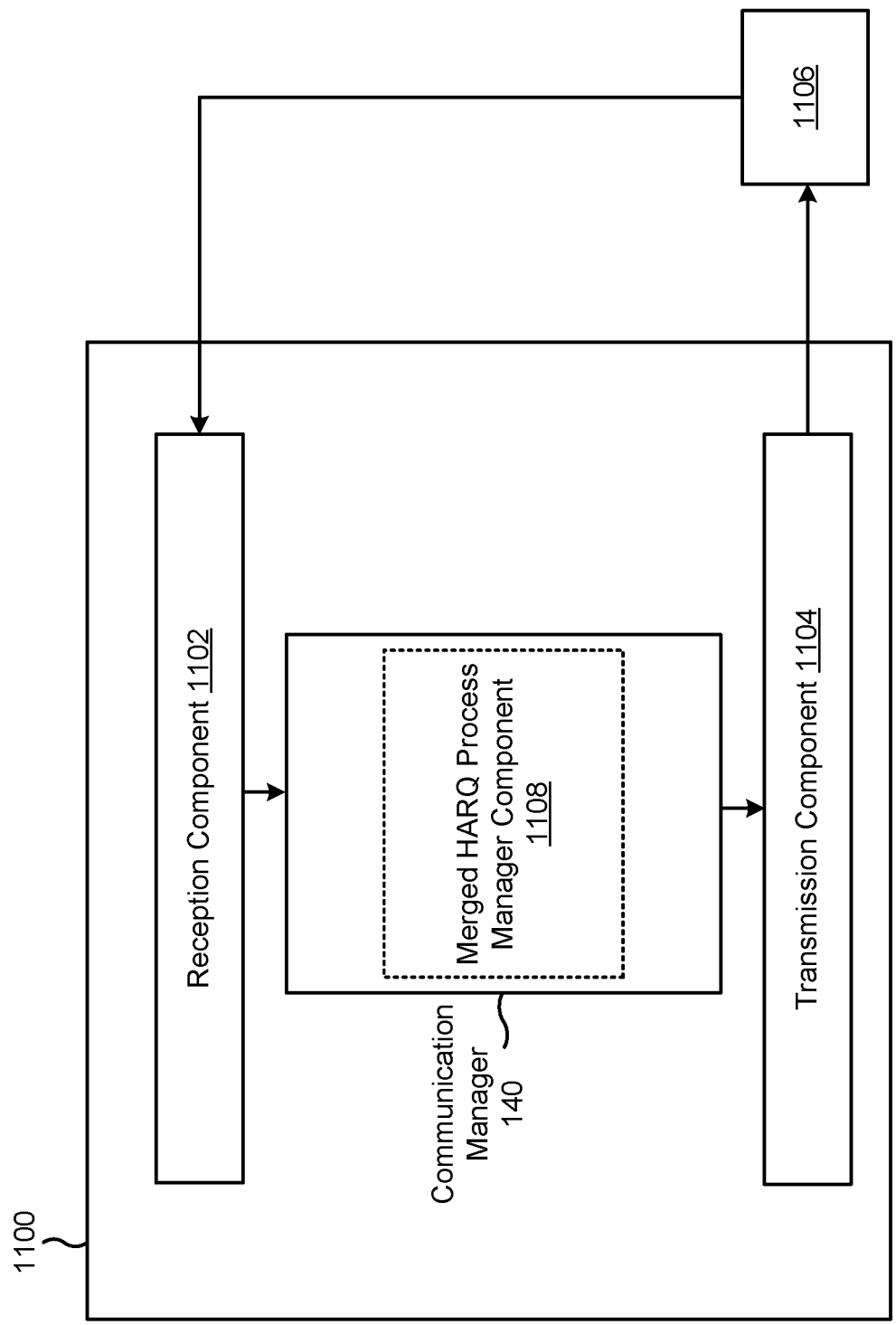
FIG. 11 is a diagram of an example apparatus for wireless communication, in accordance with the present disclosure.

In some aspects, the merged HARQ process manager component 1008 included in the apparatus 1000 may perform one or more actions as those described with regard to the merged HARQ process manager component 1108 as described with regard to FIG. 11.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a merged HARQ process manager component 1108, among other examples.

In some aspects, the apparatus 1100 may be configured to perform one or more operations described herein in connection with FIGS. 4A-9. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The merged HARQ process manager component 1108 may receive, by way of the reception component 1102, a multi-cell scheduling DCI associated with at least two CCs for multi-cell communication by the UE, the multi-cell scheduling DCI including a merged HARQ process identification field that is based at least in part on a merged HARQ process space associated with the at least two CCs. The merged HARQ process manager component 1108 may transmit, by way of the transmission component 1104, HARQ feedback associated with the multi-cell communication, the HARQ feedback being based at least in part on the HARQ process identification field.

The merged HARQ process manager component 1108 may receive, by way of the reception component 1102 and in the HARQ process identification field, a first HARQ process ID associated with a first scheduled component carrier of the at least two CCs. Alternatively or additionally, the merged HARQ process manager component 1108 may calculate a second HARQ process ID associated with a second scheduled component carrier of the at least two CCs is based at least in part on incrementing the first HARQ process ID by an integer value of one. In some aspects, the merged HARQ process manager component 1108 may refrain from assigning a HARQ process ID to one CC of the at least two CCs based at least in part on detecting an SLIV error.

The merged HARQ process manager component 1108 may receive, by way of the reception component 1102, an updated multi-cell scheduling DCI based at least in part on an updated merged HARQ process space. Alternatively or additionally, the merged HARQ process manager component 1108 may receive, by way of the reception component 1102, an indication to reset one or more HARQ processes associated with the number of activated CCs.

In some aspects, the merged HARQ process manager component 1108 included in the apparatus 1100 may perform one or more actions as those described with regard to the merged HARQ process manager component 1008 as described with regard to FIG. 10.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: transmitting a multi-cell scheduling downlink control information (DCI) associated with at least two component carriers (CCs) for multi-cell communication with a user equipment (UE), the multi-cell scheduling DCI including a hybrid automatic repeat request (HARQ) process identification field that is based at least in part on a merged HARQ process space associated with the at least two CCs; and receiving HARQ feedback associated with the multi-cell communication, the HARQ feedback being based at least in part on the merged HARQ process space.

Aspect 2: The method of Aspect 1, wherein the multi-cell scheduling DCI indicates multi-cell physical downlink shared channel scheduling.

Aspect 3: The method of Aspect 1, wherein the multi-cell scheduling DCI indicates multi-cell physical uplink shared channel scheduling.

Aspect 4: The method of any one of Aspects 1-3, further comprising: configuring the merged HARQ process space based at least in part on a cell group (CG).

Aspect 5: The method of Aspect 4, wherein the merged HARQ process space is based at least in part on dual connectivity.

Aspect 6: The method of any one of Aspects 1-4, wherein the merged HARQ process space is based at least in part on a physical uplink control channel (PUCCH) cell group.

Aspect 7: The method of Aspect 6, wherein the merged HARQ process space is based at least in part on the UE being configured with a PUCCH secondary cell.

Aspect 8: The method of any one of Aspects 1-7, wherein M is an integer associated with a total number of HARQ processes for the merged HARQ process space, and wherein the HARQ process identification field includes log 2(M) bits.

Aspect 9: The method of Aspect 8, further comprising: including, in the HARQ process identification field, a first HARQ process identifier (ID) associated with a first scheduled component carrier of the at least two CCs.

Aspect 10: The method of Aspect 9, further comprising: indicating that a second HARQ process ID associated with a second scheduled component carrier of the at least two CCs is based at least in part on incrementing the first HARQ process ID by an integer value of one.

Aspect 11: The method of Aspect 9, further comprising: indicating to refrain from assigning a HARQ process ID to one CC of the at least two CCs based at least in part on detecting a start length indicator value (SLIV) error.

Aspect 12: The method of any one of Aspects 9-11, further comprising: determining to schedule a first subset of CCs of the at least two CCs; determining to refrain from scheduling a second subset of CCs of the at least two CCs; and indicating, in the multi-cell scheduling DCI, that the first HARQ process ID is associated with the first subset of CCs and disassociated with the second subset of CCs.

Aspect 13: The method of any one of Aspects 1-12, wherein receiving the HARQ feedback further comprises: receiving a negative acknowledgement for a first transport block associated with a first HARQ process, wherein the first HARQ process is associated with a first CC of the at least two CCs; and retransmitting the first transport block based at least in part on a second CC of the at least two CCs.

Aspect 14: The method of Aspect 13, wherein the first CC is associated with a first serving cell and the second CC is associated with a second serving cell.

Aspect 15: The method of any one of Aspects 1-14, wherein the at least two CCs are based at least in part on a secondary cell, and the method further comprises: detecting a state change for the secondary cell; and maintaining the merged HARQ process space.

Aspect 16: The method of Aspect 15, wherein the state change comprises at least one of: an activation state change, or a dormancy state change.

Aspect 17: The method of Aspect 15 or Aspect 16, wherein maintaining the merged HARQ process space comprises: refraining from resetting a HARQ state associated with the merged HARQ process space.

Aspect 18: The method of any one of Aspects 1-14, wherein the at least two CCs are based at least in part on a secondary cell, and the method further comprises: detecting a state change for the secondary cell; and determining an updated merged HARQ process space based at least in part on the state change.

Aspect 19: The method of Aspect 18, wherein determining the updated merged HARQ process space further comprises: determining that a number of activated CCs included in the at least two CCs has changed from a first quantity of CCs to a second quantity of CCs; and recalculating a total number of HARQ processes for the merged HARQ process space based at least in part on the at least two CCs including the second quantity of CCs.

Aspect 20: The method of Aspect 19, wherein: the first quantity is less than the second quantity, or the first quantity is greater than the second quantity.

Aspect 21: The method of Aspect 19 or Aspect 20, further comprising: transmitting an updated multi-cell scheduling DCI based at least in part on the updated merged HARQ process space.

Aspect 22: The method of Aspect 21, wherein the updated multi-cell scheduling DCI has a first size that is based at least in part on the number of activated CCs including the second quantity of CCs, and wherein the multi-cell scheduling DCI has a second size that is based at least in part on the first quantity of CCs.

Aspect 23: The method of Aspect 22, wherein a first HARQ process identification field size included in the updated multi-cell scheduling DCI is different from a second HARQ process identification field size included in the multi-cell scheduling DCI.

Aspect 24: The method of any one of Aspects 19-23, wherein determining that the number of activated CCs included in the at least two CCs has changed comprises: determining that the number of activated CCs has decreased, and wherein the method further comprises: resetting one or more HARQ processes associated with the number of activated CCs.

Aspect 25: The method of any one of Aspects 19-23, wherein determining that the number of activated CCs included in the at least two CCs has changed comprises: determining that the number of activated CCs has increased, and wherein the method further comprises: refraining from resetting one or more HARQ processes associated with the number of activated CCs.

Aspect 26: A method of wireless communication performed by a user equipment (UE), comprising: receiving a multi-cell scheduling downlink control information (DCI) associated with at least two component carriers (CCs) for multi-cell communication by the UE, the multi-cell scheduling DCI including a merged hybrid automatic repeat request (HARQ) process identification field that is based at least in part on a merged HARQ process space associated with the at least two CCs; and transmitting HARQ feedback associated with the multi-cell communication, the HARQ feedback being based at least in part on the HARQ process identification field.

Aspect 27: The method of Aspect 26, wherein the multi-cell scheduling DCI indicates multi-cell physical downlink shared channel scheduling.

Aspect 28: The method of Aspect 26, wherein the multi-cell scheduling DCI indicates multi-cell physical uplink shared channel scheduling.

Aspect 29: The method of any one of Aspects 26-28, wherein the merged HARQ process space based at least in part on a cell group.

Aspect 30: The method of any one of Aspects 26-28, wherein the merged HARQ process space is based at least in part on dual connectivity.

Aspect 31: The method of Aspect 26, wherein the merged HARQ process space is based at least in part on a physical uplink control channel (PUCCH) cell group.

Aspect 32: The method of Aspect 31, wherein the merged HARQ process space is based at least in part on the UE being configured with a PUCCH secondary cell.

Aspect 33: The method of any one of Aspects 26-32, wherein M is an integer associated with a total number of HARQ processes for the merged HARQ process space, and wherein the HARQ process identification field includes log 2(M) bits.

Aspect 34: The method of Aspect 33, further comprising, receiving, in the HARQ process identification field, a first HARQ process identifier (ID) associated with a first scheduled component carrier of the at least two CCs.

Aspect 35: The method of Aspect 34, further comprising: calculating a second HARQ process ID associated with a second scheduled component carrier of the at least two CCs is based at least in part on incrementing the first HARQ process ID by an integer value of one.

Aspect 36: The method of Aspect 35, further comprising: refraining from assigning a HARQ process ID to one CC of the at least two CCs based at least in part on detecting a start length indicator value (SLIV) error.

Aspect 37: The method of Aspect 35, wherein the multi-cell scheduling DCI indicates that the first HARQ process ID is associated with a first subset of CCs of the at least two CCs and disassociated with a second set of CCs of the at least two CCs.

Aspect 38: The method of any one of Aspects 26-37, wherein transmitting the HARQ feedback further comprises: transmitting a negative acknowledge for a first transport block associated with a first HARQ process, wherein the first HARQ process is associated with a first CC of the at least two CCs; and receiving a retransmission of the first transport block based at least in part on a second CC of the at least two CCs.

Aspect 39: The method of Aspect 38, wherein the first CC is associated with a first serving cell and the second CC is associated with a second serving cell.

Aspect 40: The method of any one of Aspects 26-39, further comprising: receiving an updated multi-cell scheduling DCI based at least in part on an updated merged HARQ process space.

Aspect 41: The method of Aspect 40, wherein a first HARQ process identification field size included in the updated multi-cell scheduling DCI is different from a second HARQ process identification field size included in the multi-cell scheduling DCI.

Aspect 42: The method of Aspect 40 or Aspect 41, wherein the updated merged HARQ space is based at least in part on a number of activated CCs included in the at least two CCs changing from a first quantity of CCs to a second quantity of CCs.

Aspect 43: The method of Aspect 42, wherein: the second quantity is less than the first quantity, or the second quantity is greater than the first quantity.

Aspect 44: The method of Aspect 42 or Aspect 43, wherein the updated multi-cell scheduling DCI has a first size that is based at least in part on the number of activated CCs including the second quantity of CCs, and wherein the multi-cell scheduling DCI has a second size that is based at least in part on the first quantity of CCs.

Aspect 45: The method of any one of Aspects 42-44 further comprising: receiving an indication to reset one or more HARQ processes associated with the number of activated CCs.

Aspect 46: An apparatus for wireless communication at a device, comprising a processor; memory coupled with the processor; and instructions stored in the memory and executable by the processor to cause the apparatus to perform the method of one or more of Aspects 1-25.

Aspect 47: An apparatus for wireless communication at a device, comprising a processor; memory coupled with the processor; and instructions stored in the memory and executable by the processor to cause the apparatus to perform the method of one or more of Aspects 26-45.

Aspect 48: A device for wireless communication, comprising a memory and one or more processors coupled to the memory, the one or more processors configured to perform the method of one or more of Aspects 1-25.

Aspect 49: A device for wireless communication, comprising a memory and one or more processors coupled to the memory, the one or more processors configured to perform the method of one or more of Aspects 26-45.

Aspect 50: An apparatus for wireless communication, comprising at least one means for performing the method of one or more of Aspects 1-25.

Aspect 51: An apparatus for wireless communication, comprising at least one means for performing the method of one or more of Aspects 26-45.

Aspect 52: A non-transitory computer-readable medium storing code for wireless communication, the code comprising instructions executable by a processor to perform the method of one or more of Aspects 1-25.

Aspect 53: A non-transitory computer-readable medium storing code for wireless communication, the code comprising instructions executable by a processor to perform the method of one or more of Aspects 26-45.

Aspect 54: A non-transitory computer-readable medium storing a set of instructions for wireless communication, the set of instructions comprising one or more instructions that, when executed by one or more processors of a device, cause the device to perform the method of one or more of Aspects 1-25.

Aspect 55: A non-transitory computer-readable medium storing a set of instructions for wireless communication, the set of instructions comprising one or more instructions that, when executed by one or more processors of a device, cause the device to perform the method of one or more of Aspects 26-45.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
one or more memories; and
one or more processors, coupled to the one or more memories, configured to:
transmit a multi-cell scheduling downlink control information (DCI) associated with at least two component carriers (CCs) for multi-cell communication with a user equipment (UE), the multi-cell scheduling DCI including a hybrid automatic repeat request (HARQ) process identification field that is based at least in part on a merged HARQ process space associated with the at least two CCs, wherein a number of bits used for the HARQ process identification field is based at least in part on a number of HARQ processes assigned to the merged HARQ process space; and
receive HARQ feedback associated with the multi-cell communication, the HARQ feedback being based at least in part on the merged HARQ process space.

2. The apparatus of claim 1, wherein M is an integer associated with the number of HARQ processes for the merged HARQ process space, and
wherein the HARQ process identification field includes log base 2 of M bits.

3. The apparatus of claim 2, wherein the one or more processors are further configured to:
include, in the HARQ process identification field, a first HARQ process identifier (ID) associated with a first scheduled component carrier of the at least two CCs.

4. The apparatus of claim 3, wherein the one or more processors are further configured to:
indicate that a second HARQ process ID associated with a second scheduled component carrier of the at least two CCs is based at least in part on incrementing the first HARQ process ID by an integer value of one.

5. The apparatus of claim 3, wherein the one or more processors are further configured to:
determine to schedule a first subset of CCs of the at least two CCs;
determine to refrain from scheduling a second subset of CCs of the at least two CCs; and
indicate, in the multi-cell scheduling DCI, that the first HARQ process ID is associated with the first subset of CCs and disassociated with the second subset of CCs.

6. The apparatus of claim 1, wherein the one or more processors, to receive the HARQ feedback, are configured to:
receive a negative acknowledgement for a first transport block associated with a first HARQ process, wherein the first HARQ process is associated with a first CC of the at least two CCs; and
retransmit the first transport block based at least in part on a second CC of the at least two CCs.

7. The apparatus of claim 1, wherein the at least two CCs are based at least in part on a secondary cell, and wherein the one or more processors are further configured to:
detect a state change for the secondary cell; and
maintain the merged HARQ process space.

8. The apparatus of claim 7, wherein the one or more processors, to maintain the merged HARQ process space, are configured to:
refrain from resetting a HARQ state associated with the merged HARQ process space.

9. The apparatus of claim 1, wherein the at least two CCs are based at least in part on a secondary cell, and wherein the one or more processors are further configured to:
detect a state change for the secondary cell; and
determine an updated merged HARQ process space based at least in part on the state change.

10. The apparatus of claim 9, wherein the one or more processors, to determine the updated merged HARQ process space, are configured to:
determine that a number of activated CCs included in the at least two CCs has changed from a first quantity of CCs to a second quantity of CCs; and
recalculate the number of HARQ processes assigned to the merged HARQ process space based at least in part on the at least two CCs including the second quantity of CCs.

11. The apparatus of claim 10, wherein the one or more processors are further configured to:
transmit an updated multi-cell scheduling DCI based at least in part on the updated merged HARQ process space.

12. The apparatus of claim 11, wherein the updated multi-cell scheduling DCI has a first size that is based at least in part on the second quantity of CCs, and
wherein the multi-cell scheduling DCI has a second size that is based at least in part on the first quantity of CCs.

13. An apparatus for wireless communication at a user equipment (UE), comprising:
one or more memories; and
one or more processors, coupled to the one or more memories, configured to:
receive a multi-cell scheduling downlink control information (DCI) associated with at least two component carriers (CCs) for multi-cell communication by the UE, the multi-cell scheduling DCI including a merged hybrid automatic repeat request (HARQ) process identification field that is based at least in part on a merged HARQ process space associated with the at least two CCs, wherein a number of bits used for the HARQ process identification field is based at least in part on a number of HARQ processes assigned to the merged HARQ process space; and
transmit HARQ feedback associated with the multi-cell communication, the HARQ feedback being based at least in part on the HARQ process identification field.

14. The apparatus of claim 13, wherein M is an integer associated with the number of HARQ processes for the merged HARQ process space, and
wherein the HARQ process identification field includes log base 2 of M bits.

15. The apparatus of claim 14, wherein the one or more processors are further configured to, receive, in the HARQ process identification field, a first HARQ process identifier (ID) associated with a first scheduled component carrier of the at least two CCs.

16. The apparatus of claim 15, wherein the one or more processors are further configured to:
calculate a second HARQ process ID associated with a second scheduled component carrier of the at least two CCs is based at least in part on incrementing the first HARQ process ID by an integer value of one.

17. The apparatus of claim 16, wherein the one or more processors are further configured to:
refrain from assigning a HARQ process ID to one CC of the at least two CCs based at least in part on detecting a start length indicator value (SLIV) error.

18. The apparatus of claim 13, wherein the one or more processors, to transmit the HARQ feedback, are configured to:
transmit a negative acknowledge for a first transport block associated with a first HARQ process, wherein the first HARQ process is associated with a first CC of the at least two CCs; and
receive a retransmission of the first transport block based at least in part on a second CC of the at least two CCs.

19. The apparatus of claim 13, wherein the one or more processors are further configured to:
receive an updated multi-cell scheduling DCI based at least in part on an updated merged HARQ process space.

20. The apparatus of claim 19, wherein a first HARQ process identification field size included in the updated multi-cell scheduling DCI is different from a second HARQ process identification field size included in the multi-cell scheduling DCI.

21. The apparatus of claim 19, wherein the updated merged HARQ space is based at least in part on a number of activated CCs included in the at least two CCs changing from a first quantity of CCs to a second quantity of CCs.

22. The apparatus of claim 21, wherein the one or more processors are further configured to:
receive an indication to reset one or more HARQ processes associated with the number of activated CCs.

23. A method of wireless communication performed by a network node, comprising:
transmitting a multi-cell scheduling downlink control information (DCI) associated with at least two component carriers (CCs) for multi-cell communication with a user equipment (UE), the multi-cell scheduling DCI including a hybrid automatic repeat request (HARQ) process identification field that is based at least in part on a merged HARQ process space associated with the at least two CCs, wherein a number of bits used for the HARQ process identification field is based at least in part on a number of HARQ processes assigned to the merged HARQ process space; and
receiving HARQ feedback associated with the multi-cell communication, the HARQ feedback being based at least in part on the merged HARQ process space.

24. The method of claim 23, further comprising:
including, in the HARQ process identification field, a first HARQ process identifier (ID) associated with a first scheduled component carrier of the at least two CCs.

25. The method of claim 24, further comprising:
indicating that a second HARQ process ID associated with a second scheduled component carrier of the at least two CCs is based at least in part on incrementing the first HARQ process ID by an integer value of one.

26. The method of claim 23, wherein receiving the HARQ feedback further comprises:
receiving a negative acknowledgement for a first transport block associated with a first HARQ process, wherein the first HARQ process is associated with a first CC of the at least two CCs; and
retransmitting the first transport block based at least in part on a second CC of the at least two CCs.

27. The method of claim 23, wherein the at least two CCs are based at least in part on a secondary cell, and the method further comprises:
detecting a state change for the secondary cell;
determining an updated merged HARQ process space based at least in part on the state change;
determining that a number of activated CCs included in the at least two CCs has changed from a first quantity of CCs to a second quantity of CCs; and
recalculating the number of HARQ processes assigned to the merged HARQ process space based at least in part on the at least two CCs including the second quantity of CCs.

28. A method of wireless communication performed by a user equipment (UE), comprising:
receiving a multi-cell scheduling downlink control information (DCI) associated with at least two component carriers (CCs) for multi-cell communication by the UE, the multi-cell scheduling DCI including a merged hybrid automatic repeat request (HARQ) process identification field that is based at least in part on a merged HARQ process space associated with the at least two CCs, wherein a number of bits used for the HARQ process identification field is based at least in part on a number of HARQ processes assigned to the merged HARQ process space; and
transmitting HARQ feedback associated with the multi-cell communication, the HARQ feedback being based at least in part on the HARQ process identification field.

29. The method of claim 28, further comprising,
receiving, in the HARQ process identification field, a first HARQ process identifier (ID) associated with a first scheduled component carrier of the at least two CCs; and
calculating a second HARQ process ID associated with a second scheduled component carrier of the at least two CCs is based at least in part on incrementing the first HARQ process ID by an integer value of one.

30. The method of claim 28, wherein transmitting the HARQ feedback further comprises:
transmitting a negative acknowledge for a first transport block associated with a first HARQ process, wherein the first HARQ process is associated with a first CC of the at least two CCs; and
receiving a retransmission of the first transport block based at least in part on a second CC of the at least two CCs.

* * * * *